(12) United States Patent
Ganjam et al.

(10) Patent No.: US 10,841,167 B2
(45) Date of Patent: *Nov. 17, 2020

(54) NETWORK INSIGHTS

(71) Applicant: Conviva Inc., Foster City, CA (US)

(72) Inventors: Aditya Ravikumar Ganjam, San Francisco, CA (US); Shubo Liu, San Carlos, CA (US); Wensi Fu, Sunnyvale, CA (US); Dmitry Ryashchenstsev, Denver, CO (US); Jibin Zhan, Foster City, CA (US)

(73) Assignee: Conviva Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,396

(22) Filed: Apr. 8, 2019

(65) Prior Publication Data

US 2019/0363942 A1 Nov. 28, 2019

Related U.S. Application Data

(63) Continuation of application No. 15/252,176, filed on Aug. 30, 2016, now Pat. No. 10,305,746.

(Continued)

(51) Int. Cl.
*H04L 12/24* (2006.01)
*H04L 29/06* (2006.01)
(Continued)

(52) U.S. Cl.
CPC .......... *H04L 41/12* (2013.01); *H04L 41/0631* (2013.01); *H04L 41/5067* (2013.01);
(Continued)

(58) Field of Classification Search
CPC . H04L 41/0213; H04L 41/0631; H04L 41/12; H04L 43/08; H04L 61/2007;
(Continued)

(56) References Cited

U.S. PATENT DOCUMENTS 7,536,396 B2  5/2009  Johnson
9,451,306 B2  9/2016  Sarukkai
(Continued)

OTHER PUBLICATIONS

Ahmed et al., Suffering from Buffering? Detecting QoE Impairments in Live Video Streams, 2017 IEEE 25th International Conference on Network Protocols (ICNP), 2017.
(Continued)

*Primary Examiner* — Ruolei Zong
(74) *Attorney, Agent, or Firm* — Van Pelt, Yi & James LLP

(57) ABSTRACT

Providing network insights is disclosed. A mapping between a device identifier and one or more nodes in a network topology associated with a network service provider is obtained. End user experience data associated with the device identifier is obtained. Based at least in part on the device identifier. at least some of the obtained end user experience data is associated with at least some of the one or more nodes in the network topology associated with the network service provider. Processing is performed based at least in part on the association of the at least some of the obtained end user experience data with the at least some of the one or more nodes in the network topology associated with the network service provider. Output is provided based at least in part on the processing.

21 Claims, 40 Drawing Sheets

Related U.S. Application Data

(60) Provisional application No. 62/372,629, filed on Aug. 9, 2016.

(51) Int. Cl.
*H04L 29/12* (2006.01)
*H04W 4/18* (2009.01)

(52) U.S. Cl.
CPC ...... *H04L 61/2007* (2013.01); *H04L 61/6022* (2013.01); *H04L 65/80* (2013.01); *H04W 4/18* (2013.01); *H04L 61/103* (2013.01)

(58) Field of Classification Search
CPC . H04L 61/6022; H04L 63/1408; H04L 65/80; H04L 67/146
USPC ........................................................ 709/223
See application file for complete search history.

(56) References Cited

U.S. PATENT DOCUMENTS

| | | |
|---|---|---|
| 9,509,710 B1 | 11/2016 | Barry |
| 2003/0187986 A1 | 10/2003 | Sundqvist |
| 2004/0078470 A1 | 4/2004 | Baumeister |
| 2005/0083844 A1 | 4/2005 | Zhu |
| 2006/0282225 A1 | 12/2006 | Sunshine |
| 2007/0002897 A1 | 1/2007 | Goshen |
| 2007/0263984 A1 | 11/2007 | Sterner |
| 2007/0288518 A1 | 12/2007 | Crigler |
| 2008/0225706 A1 | 9/2008 | Lange |
| 2009/0054074 A1 | 2/2009 | Aaron |
| 2012/0311126 A1 | 12/2012 | Jadallah |
| 2013/0014137 A1 | 1/2013 | Bhatia |
| 2013/0227648 A1 | 8/2013 | Ricci |
| 2014/0160941 A1 | 6/2014 | Hui |
| 2014/0337871 A1 | 11/2014 | Garcia De Blas |
| 2014/0351840 A1 | 11/2014 | Andrade |
| 2015/0195126 A1* | 7/2015 | Vasseur ............... H04L 41/5025 370/218 |
| 2016/0112894 A1* | 4/2016 | Lau ....................... H04W 24/10 370/252 |
| 2016/0156520 A1* | 6/2016 | Scully .................. H04W 24/02 370/254 |
| 2016/0164761 A1 | 6/2016 | Sathyanarayana |
| 2016/0170818 A1 | 6/2016 | Zhu |
| 2016/0232538 A1 | 8/2016 | Papakostas |
| 2016/0241927 A1 | 8/2016 | Kilar |
| 2017/0126476 A1* | 5/2017 | Curtin ................ H04L 41/0631 |
| 2017/0171252 A1 | 6/2017 | Xue |
| 2017/0188094 A1 | 6/2017 | Ionescu |
| 2017/0223036 A1 | 8/2017 | Muddu |
| 2017/0244777 A1* | 8/2017 | Ouyang .................. H04L 65/80 |
| 2017/0250882 A1 | 8/2017 | Kellicker |
| 2018/0278487 A1 | 9/2018 | Mermoud |
| 2018/0288461 A1 | 10/2018 | Funk |
| 2019/0045235 A1 | 2/2019 | Giladi |
| 2019/0308509 A1 | 10/2019 | Herman |

OTHER PUBLICATIONS

Manferdini et al., Cross-Check of Analysis Modules and Reasoner Interactions, Oct. 30, 2014, pp. 1-75.
Manferdini et al., Cross-Check of Analysis Modules and Reasoner Interactions, Oct. 30, 2014, pp. 76-150.

\* cited by examiner

| CMTS | Fail Rate | Session Count | Label | Confidence |
|---|---|---|---|---|
| cmts1_hub31_man1 | 85% | 688 | Bad | 99% |
| cmts1_hub47_man1 | 23% | 117 | Bad | 99% |
| cmts1_hub37_man1 | 17% | 53 | Bad | 99% |
| cmts1_hub39_man1 | 11% | 61 | Bad | 92% |
| cmts1_hub41_man1 | 11% | 89 | Bad | 97% |
| cmts1_hub34_man1 | 10% | 164 | Bad | 99% |
| cmts1_hub45_man1 | 9% | 67 | Bad | 76% |
| cmts1_hub40_man1 | 4% | 72 | Good | 12% |
| cmts2_hub32_man1 | 1% | 76 | Good | 98% |
| cmts1_hub44_man1 | 0% | 12 | Good | 49% |
| cmts1_hub42_man1 | 0% | 15 | Good | 56% |
| cmts2_hub43_man1 | 0% | 1 | Good | 10% |

FIG. 6A

| SG | Fail Rate | Session Count | Label | Confidence |
|---|---|---|---|---|
| sg21_cmts1_hub47_man1 | 0% | 9 | Good | 40% |
| sg23_cmts1_hub47_man1 | 0% | 7 | Good | 34% |
| sg27_cmts1_hub47_man1 | 0% | 2 | Good | 14% |
| sg28_cmts1_hub47_man1 | 0% | 1 | Good | 10% |
| sg29_cmts1_hub47_man1 | 0% | 2 | Good | 14% |
| sg30_cmts1_hub47_man1 | 20% | 5 | Bad | 77% |
| sg31_cmts1_hub47_man1 | 100% | 20 | Bad | 99% |
| sg34_cmts1_hub47_man1 | 18% | 17 | Bad | 79% |
| sg35_cmts1_hub47_man1 | 0% | 11 | Good | 46% |
| sg50_cmts1_hub47_man1 | 0% | 2 | Good | 14% |
| sg52_cmts1_hub47_man1 | 0% | 5 | Good | 26% |
| sg58_cmts1_hub47_man1 | 50% | 4 | Bad | 99% |
| sg17_cmts1_hub47_man1 | 0% | 1 | Good | 10% |
| sg18_cmts1_hub47_man1 | 50% | 2 | Bad | 90% |

FIG. 6B

| CDN | Device | Publisher | Joined Sessions | Total Sessions | Fail Rate | Confidence |
|---|---|---|---|---|---|---|
| IN HOUSE | Android | Publisher_A | 280 | 2179 | 87% | 99% |
| IN HOUSE | FI | Publisher_A | 83 | 591 | 86% | 99% |
| AKAMAI | iOS | Publisher_B | 64 | 180 | 64% | 99% |
| AKAMAI | Android | Publisher_B | 1730 | 3139 | 45% | 99% |
| AMAZON | Android | Publisher_C | 408 | 679 | 40% | 99% |
| AKAMAI | Android | Publisher_D | 58 | 84 | 31% | 99% |
| AKAMAI | FI | Publisher_D | 335 | 357 | 6% | 81% |
| LEVEL3 | FI | Publisher_E | 460 | 478 | 4% | 8% |
| LEVEL3 | FI | Publisher_B | 47 | 49 | 4% | 29% |

822

1 Parameter → Parameters Combination → Parameters Combination

FIG. 8C

| Joining | CDN | Device | Publisher | Root Cause |
|---|---|---|---|---|
| nonjoined | IN HOUSE | Android | Publisher_A | IN HOUSE, Android, 450695772 |
| nonjoined | IN HOUSE | Android | Publisher_A | IN HOUSE, Android, 450695772 |
| nonjoined | IN HOUSE | FI | Publisher_A | IN HOUSE, FI, 450695772 |
| nonjoined | AMAZON | Android | Publisher_C | AMAZON, Android, 1960180524 |
| nonjoined | AKAMAI | iOS | Publisher_B | AKAIMAI, iOS, 1960180920 |
| nonjoined | AKAMAI | Android | Publisher_B | AKAIMAI, Android |
| nonjoined | AKAMAI | Android | Publisher_A | AKAIMAI, Android |
| nonjoined | AKAMAI | Android | Publisher_C | AKAIMAI, Android |
| nonjoined | LEVEL3 | iOS | Publisher_D | |
| joined | LEVEL3 | FI | Publisher_E | |
| joined | LEVEL3 | FI | Publisher_B | |

FIG. 9

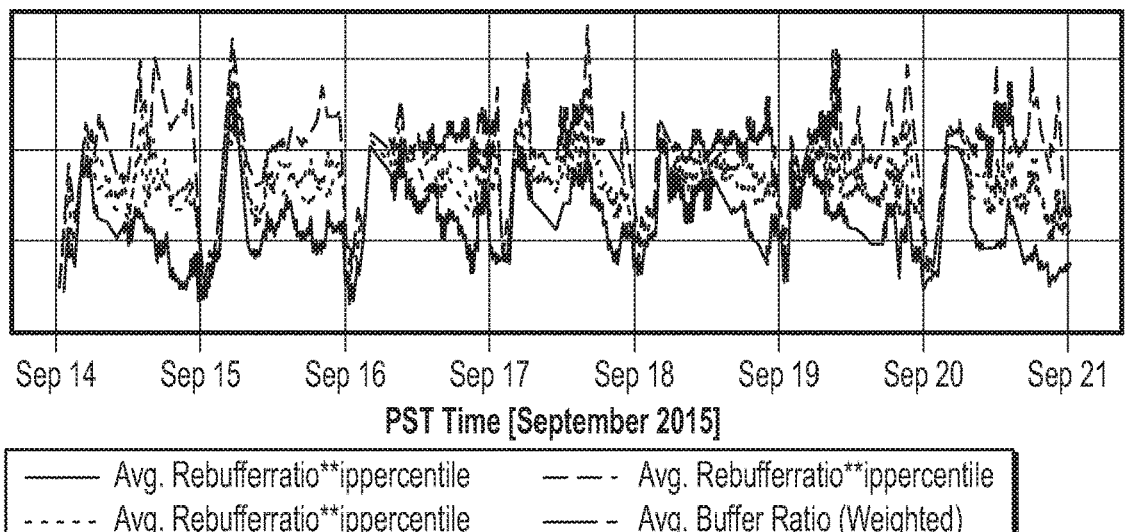
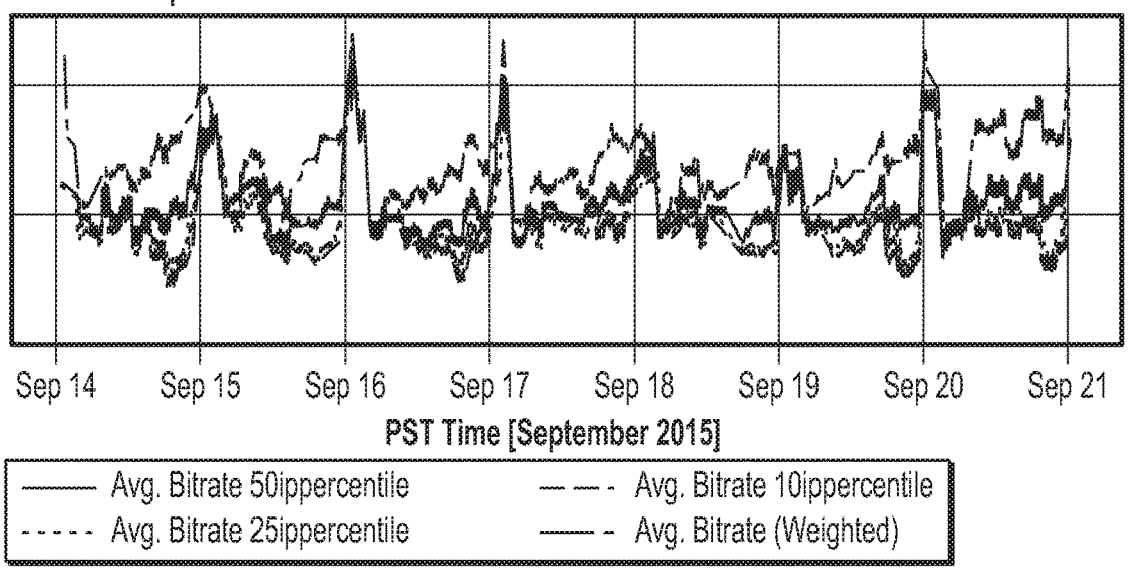
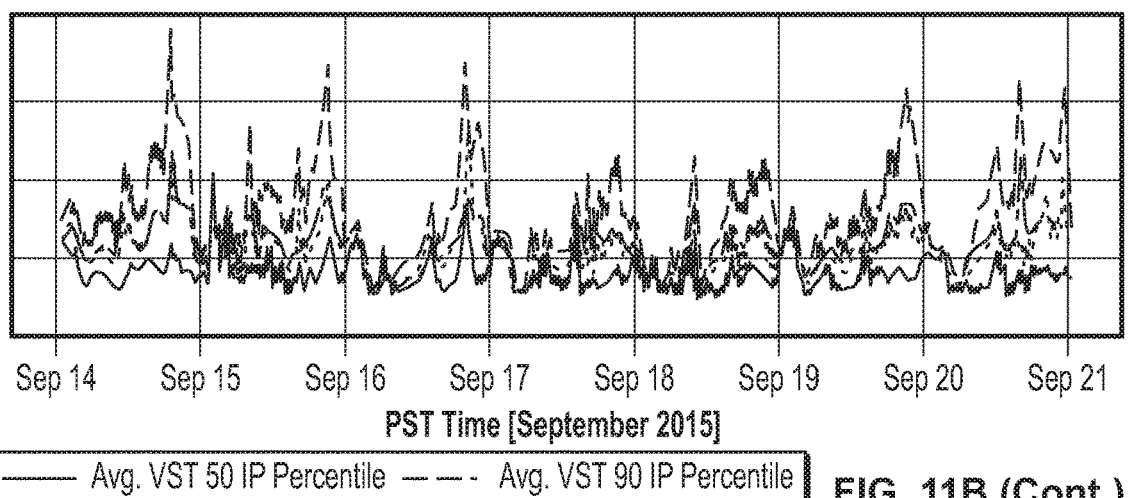
FIG. 11B (Cont.)

| State | Time | CDN | Publisher | Device | Buff Ratio | IPs |
|---|---|---|---|---|---|---|
| CA | 10/29/15 6:00 | Akamai | A | iPad | 5.4 | 107 |
| CA | 10/29/15 6:00 | Akamai | A | iPhone | 2.5 | 116 |
| CA | 10/29/15 6:00 | Akamai | A | Roku | 1.5 | 24 |
| CA | 10/29/15 6:00 | Akamai | A | Android Tablet | 0.8 | 21 |
| CA | 10/29/15 6:00 | Akamai | A | Apple TV | 0.7 | 57 |
| CA | 10/29/15 6:00 | Akamai | A | Flash | 0.4 | 37 |

| State | Time | CDN | Publisher | Device | Buff Ratio | IPs |
|---|---|---|---|---|---|---|
| CA | 10/29/15 6:00 | Limelight | B | iPad | 11.8 | 25 |
| CA | 10/29/15 6:00 | Limelight | B | iPhone | 0.4 | 14 |
| CA | 10/29/15 6:00 | Limelight | B | Flash | 0.3 | 16 |
| CA | 10/29/15 6:00 | Limelight | B | Apple TV | 0.2 | 39 |

1604

| State | Time | CDN | Publisher | Device | Buff Ratio | IPs |
|---|---|---|---|---|---|---|
| CA | 10/31/15 4:00 | Amazon | C | iPad | 44.2 | 21 |
| CA | 10/31/15 4:00 | Amazon | C | Android Tablet | 2.9 | 68 |
| CA | 10/31/15 4:00 | Amazon | C | iPhone | 1.5 | 285 |
| CA | 10/31/15 4:00 | Amazon | C | Flash | 0.6 | 120 |

FIG. 16

| IP | Service Group | Buffering Ratio | Plays |
|---|---|---|---|
| IP_Addr_1 | sg22_cmts1_hub1_man1 | 81.9 | 20 |
| IP_Addr_2 | sg26_cmts4_hub2_man2 | 47.6 | 12 |
| IP_Addr_3 | sg13_cmts1_hub3_man3 | 16.0 | 2 |
| IP_Addr_4 | sg08_cmts1_hub4_man4 | 4.9 | 1 |
| IP_Addr_5 | sg35_cmts3_hub5_man5 | 4.3 | 5 |
| IP_Addr_6 | sg10_cmts1_hub6_man6 | 3.6 | 4 |
| IP_Addr_7 | sg37_cmts2_hub7_man7 | 2.8 | 8 |
| IP_Addr_8 | sg24_cmts1_hub8_man8 | 2.6 | 6 |
| IP_Addr_9 | sg03_cmts3_hub9_man9 | 2.0 | 10 |

| IP | CDN | Device | Buffering Ratio | Buffering Time | Plays |
|---|---|---|---|---|---|
| IP_Addr_10 | Amazon | Android Phone | 0 | 0 sec | 1 |
| IP_Addr_10 | Amazon | Android Tablet | 0 | 0 sec | 16 |
| IP_Addr_10 | Amazon | iPad | 33.4 | 1,209 sec | 40 |

FIG. 18

| Fixed Attributes | Experiment Attribute |
|---|---|
| Geo (state) | CDN |
| Time (hour) | |
| Device | |
| Publisher | |

FIG. 19

| CDN | Buff Ratio | IPs |
|---|---|---|
| California, 10/27/15 1:00, Publisher A, Flash | | |
| Akamai | 9.97 | 16 |
| Amazon | 0.93 | 86 |
| Level3 | 0.41 | 4 |
| Colorado, 10/31/15 23:00, Publisher B, Android Tablet | | |
| Akamai | 5.27 | 30 |
| EdgeCast | 0.07 | 127 |
| California, 10/30/15 18:00, Publisher C, Flash | | |
| Limelight | 7.94 | 35 |
| Akamai | 0.09 | 34 |

FIG. 20B

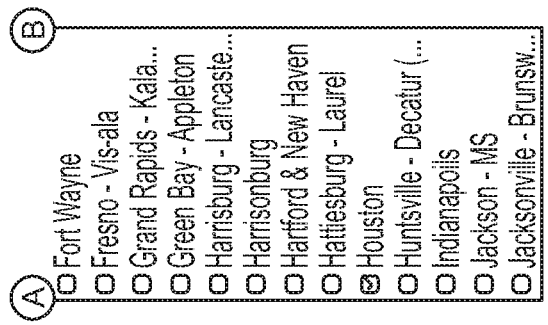

NETWORK INSIGHTS

CROSS REFERENCE TO OTHER APPLICATIONS

This application is a continuation of co-pending U.S. patent application Ser. No. 15/252,176, entitled NETWORK INSIGHTS filed Aug. 30, 2016 which is incorporated herein by reference for all purposes, which claims priority to U.S. Provisional Patent Application No. 62/372,629, entitled NETWORK INSIGHTS filed Aug. 9, 2016 which is incorporated herein by reference for all purposes.

BACKGROUND OF THE INVENTION

Users are increasingly using networks such as the Internet to access content, such as video files and live streaming/video on demand content, via client machines. Such content is often large, time sensitive, or both. As demand for such content increases, there are challenges in distributing that content efficiently and with high quality.

BRIEF DESCRIPTION OF THE DRAWINGS

Various embodiments of the invention are disclosed in the following detailed description and the accompanying drawings.

FIG. 6A illustrates an example embodiment of sample results for a CMTS node.

FIG. 6B illustrates an example embodiment of sample results for Service Group nodes in a CMTS node.

FIG. 8C illustrates an example embodiment of determining a frequent pattern.

FIG. 9 illustrates an example embodiment of labeling nodes with root causes.

FIG. 15B illustrates an example embodiment of a device instance correlation.

FIG. 16 illustrates an example embodiment of an interface for viewing device type fault isolation.

FIG. 17 illustrates an example embodiment of an interface for viewing device type fault isolation.

FIG. 18 illustrates an example embodiment of an interface for viewing device type fault isolation.

FIG. 19 illustrates an example embodiment of an interface for CDN fault isolation.

FIG. 20B illustrates an example embodiment of an interface for CDN fault isolation.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
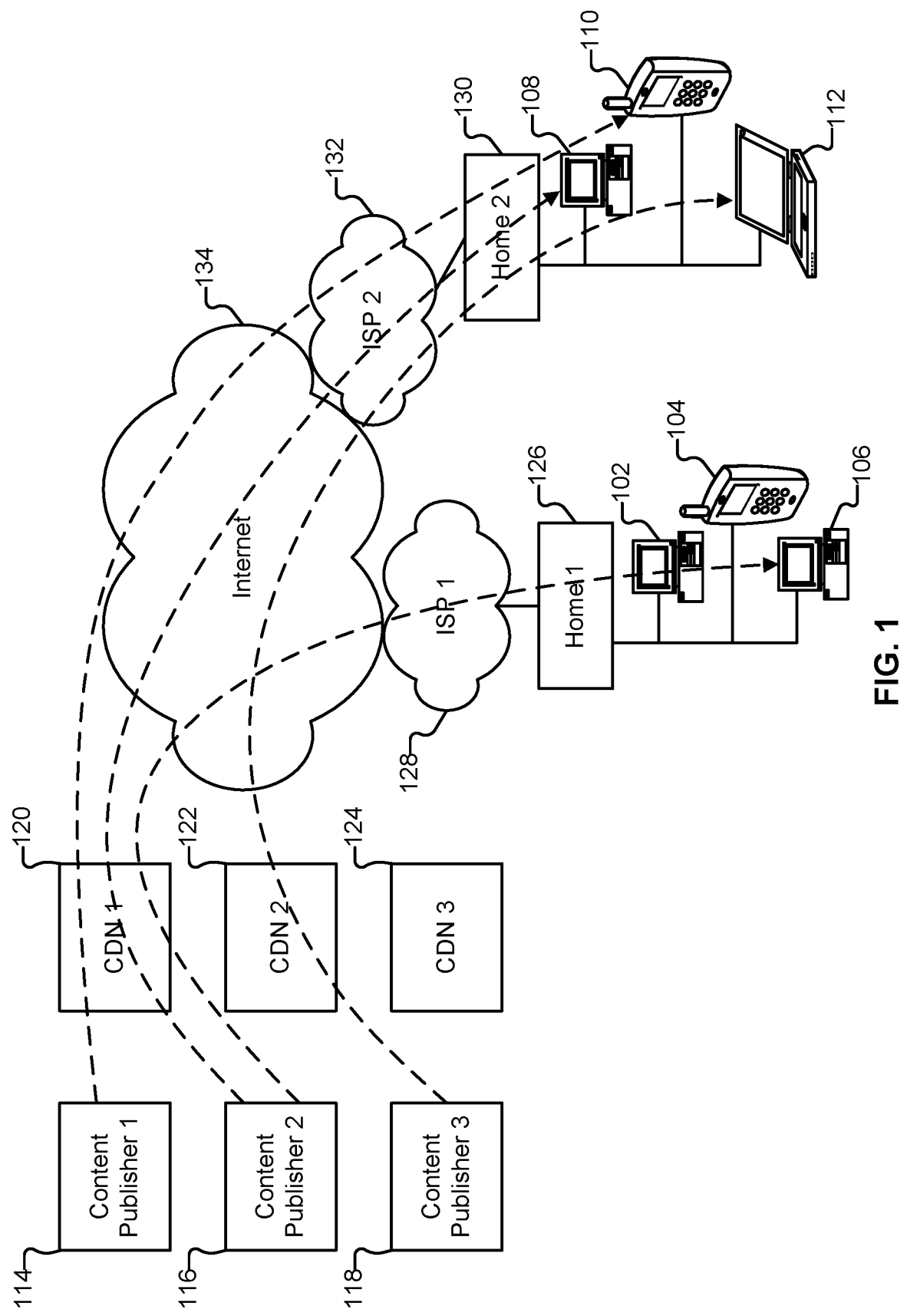
FIG. 1 illustrates an embodiment of an environment in which content is distributed.

FIG. 1 illustrates an embodiment of an environment in which content is distributed. In the example shown, clients 102-112 are used to access content, such as multimedia or audiovisual content (e.g., movies, songs, television shows, sporting events, games, images, etc.) that is owned by content owners 114-118. The content is stored (or captured) at origin servers, and distributed via content sources such as content distribution networks (CDNs) 120-124. A content owner is also referred to herein as a "content publisher," as the content owners publish their content using content sources such as CDNs 120-124.

Examples of clients include personal computers, laptops, cellular phones/personal digital assistants, and other types of information appliances or devices such as set-top boxes, games consoles, broadband routers, file servers, video servers, and digital video recorders, as applicable.

The clients shown are used by subscribers to various Internet service providers (ISPs). For example, clients 102-106 are used in a first household (126) that subscribes to ISP 1 (128), while clients 108-112 are used in a second household (130) that subscribes to ISP 2 (132).

When content is distributed to clients 102-112 by content publishers 114-118 via CDNs 120-124, the content may traverse through potentially multiple backbone ISPs (represented by network cloud 134) before connecting to local ISPs 128 and 132, which provide, via their respective infrastructures, the content to client devices 102-112 used by their respective subscribers. As shown in this example, content from different publishers may travel through various distribution paths that include the same or different CDNs and ISPs.

Issues that arise in content distribution (leading to a poor viewing experience for end users) may be due to faults that can occur at various points in a content distribution path. For example, faults may occur at the content publisher or the CDNs used to publish the content. Issues may also arise within a home network (e.g., due to an issue with a wireless router or access point) or at end user devices.

Faults may also occur inside the networks of ISPs. One typical goal for ISPs is to serve or provide a quality experience for their subscribers and end users of their networks. However, it can be challenging for ISPs to determine whether their end users are being provided with quality service, or if their network is causing its subscribers to have a poor end user experience. Further, even if the fault for poor end user experience could be attributed to the ISP, it can be difficult for the ISPs, which are composed of numerous network components (also referred to herein as nodes), to determine where the fault lies within their network or why some portion of their network is contributing to poor end user experience, as they typically only have limited visibility or insight into their network infrastructure, such as low level measurements of how the components of their network are operating.

For example, while a network provider may have information about the state of its components, such as the capacity or utilization of components such as switches or servers, etc., it can be difficult for the ISPs to determine whether some component in their network infrastructure is operating in a state that negatively affects or impacts end user experience, or what it is about a component that is causing or otherwise contributing to poor end user experience.

Described herein are techniques for providing network insights. As will be described in further detail below, using the techniques described herein, diverse viewer experience data can be collected from end user client devices and correlated with information about a network provider's topology to provide various network insights. For example, an ISP can be provided insights into whether end users are experiencing issues with their service, where the faults are in their network topology (e.g., specific components) that are causing poor end user experience, as well as what it is about the source of the fault that is contributing to the experience issues (i.e., the reason for the issues). Using the techniques described herein, service providers can also be provided with reports on recommendations for how the network provider can improve, or how the service provider compares to its competitors.

While example embodiments in a video streaming (e.g., live and on-demand streaming) ecosystem are described throughout, the techniques described herein can variously be adapted to accommodate any type of audiovisual or multimedia content distribution, as applicable.

Figure 2:
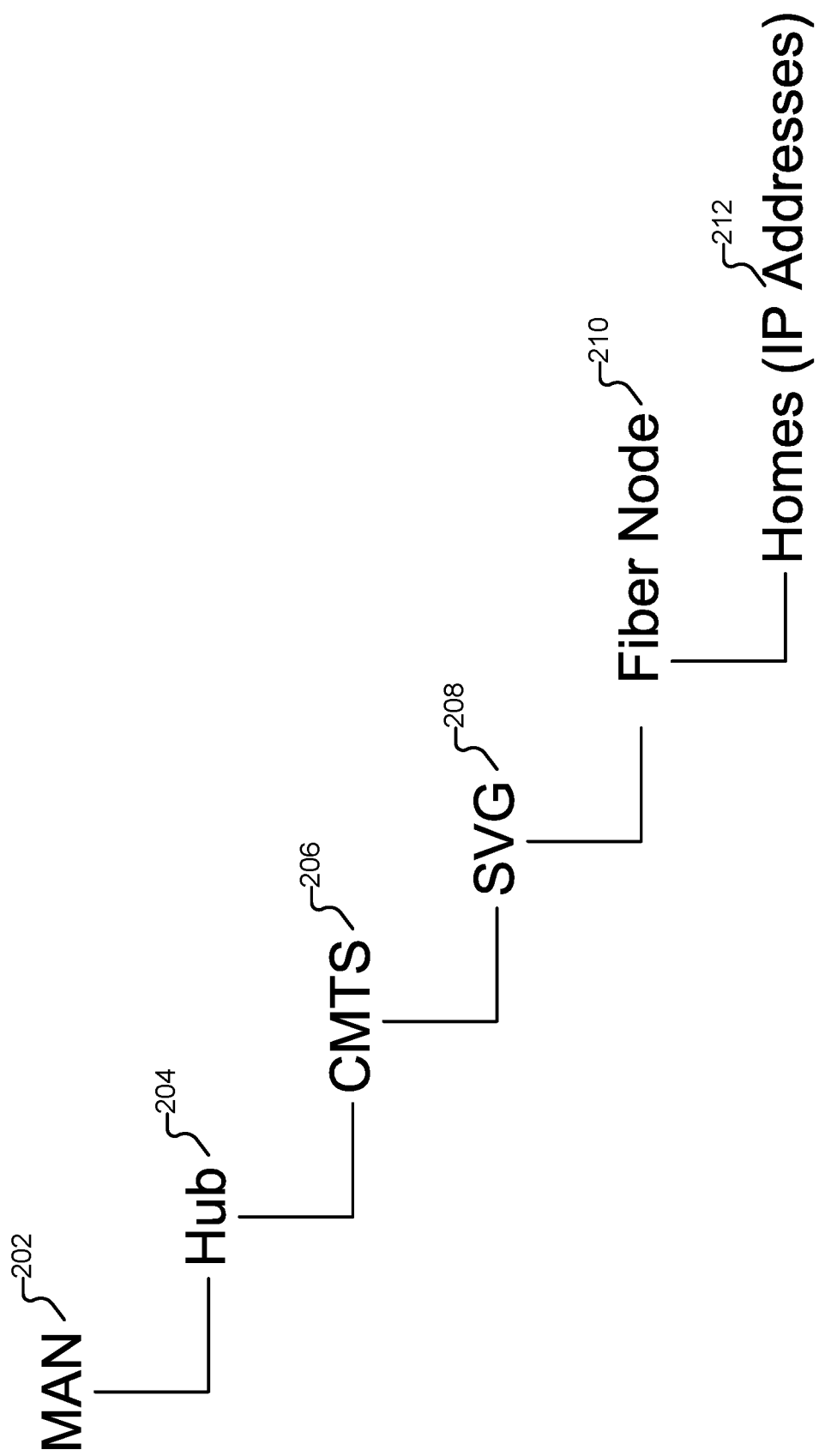
FIG. 2 illustrates an embodiment of a network topology.

FIG. 2 illustrates an embodiment of a network topology. In this example, an embodiment of a network topology or hierarchy or organizational network structure for a cable provider is shown. Various network components in the network topology are shown in this example. Different ISPs may have different topologies. Other examples of network topologies for other types of network providers (e.g., PON (Passive Optical Network) (e.g., for DSL), cellular networks, etc.) will be described below.

In the example shown, the cable network includes a number of Metropolitan Area Networks (MANs) (202). The MANs are typically major metropolitan area networks that are built over fiber. One example is a MAN for the San Francisco Bay Area.

At the next level of the topology in this example, each MAN has a number of hubs (204). Each hub may correspond to a major city in the MAN. For example, the SF Bay Area MAN may include San Francisco, San Jose, etc., hubs.

In this example, at the next level of the topology, each hub has a number of CMTSes (Cable Modem Termination Systems) (206). In some embodiments a CMTS is a combination of switches/routers. A CMTS may be at the neighborhood level of a city.

At the next level of the topology in this example, each CMTS has a number of service groups (208). Each service group can correspond to a port on the CMTS.

In this example, at the next level of the topology, each service group has a number of fiber nodes (e.g., fiber splitters) (210).

At the next level of the topology in this example, each fiber node services a number of homes (212), where each home is provided or assigned a (public) IP address by the ISP. In some embodiments, all devices on a home's network will appear to be associated with the same IP address assigned by the ISP (but may have different port numbers).

When determining whether there are failures, problems, or issues in the service they are providing, service providers can identify and address low level failures, such as cuts to fiber optic lines or failures in machinery. However, as described above, a typical goal is to provide their subscribers a high quality end user experience, and one criterion that can be used for determining whether there is an issue with the service being provided is whether end users are having a poor end user experience, which may occur even if the network's infrastructure appears otherwise operational.

As will be described in more detail below, one way in which end user experience can be measured is to evaluate end users' experiences viewing streaming content such as on demand or live video content. As users are increasingly using networks such as the Internet to access content, the viewing experience of end users can be used as an indicator or as criteria for determining whether the ISP is performing well, or if there may be potential issues with the network. For example, if subscribers are having a poor experience streaming video, then they may view the ISP negatively, and potentially switch to other network providers if their friends who are subscribers on those other networks are having a better streaming experience. Typically, however, service providers do not have access to such end user viewer experience data.

Using the techniques described herein, viewer experience data can be correlated with a network topology. As will be described in further detail below, the viewer experience data can include data about the end user's experience with respect to various viewing sessions. This viewer experience data, which can be obtained from numerous clients, can be used, for example, to determine a baseline (e.g., normal or typical) level of experience. Observed deviations in viewer experience from this baseline level can indicate that end users are having a poor viewer experience, and that there may be an issue with (e.g., a fault within) the network of a network service provider.

The viewer experience data can be collected from a diverse set of clients, who are receiving content through various different paths in the network (e.g., different combinations of publishers, CDNs, MANs, hubs, CMTSes, service groups, fiber nodes, device types, etc.). The viewer experience data can be layered with information about the network topology to determine, for example, how the end user viewer experience is correlated with the various nodes of the network. As one example, if issues with end user viewer experience are observed for a set of clients, the paths in the network topology through which content was distributed for those clients can be evaluated to isolate the source of the issue in the network topology (e.g., a particular component in the network topology). Thus, ISPs can be provided with greater insight, at a higher level of granularity, into how the components in the network topology affect or impact end user viewer experience.

For example, the location of potential faults (i.e., components that have been inferred or deduced as negatively affecting end user experience) in the network topology can be identified. The characteristics and attributes of components can also be evaluated to determine why it is that a particular component is negatively impacting end user viewer experience. The ISP can then use such insights to address any issues identified with their network topology, and make improvements to their network to provide its subscribers with better experiences.

Figure 3:
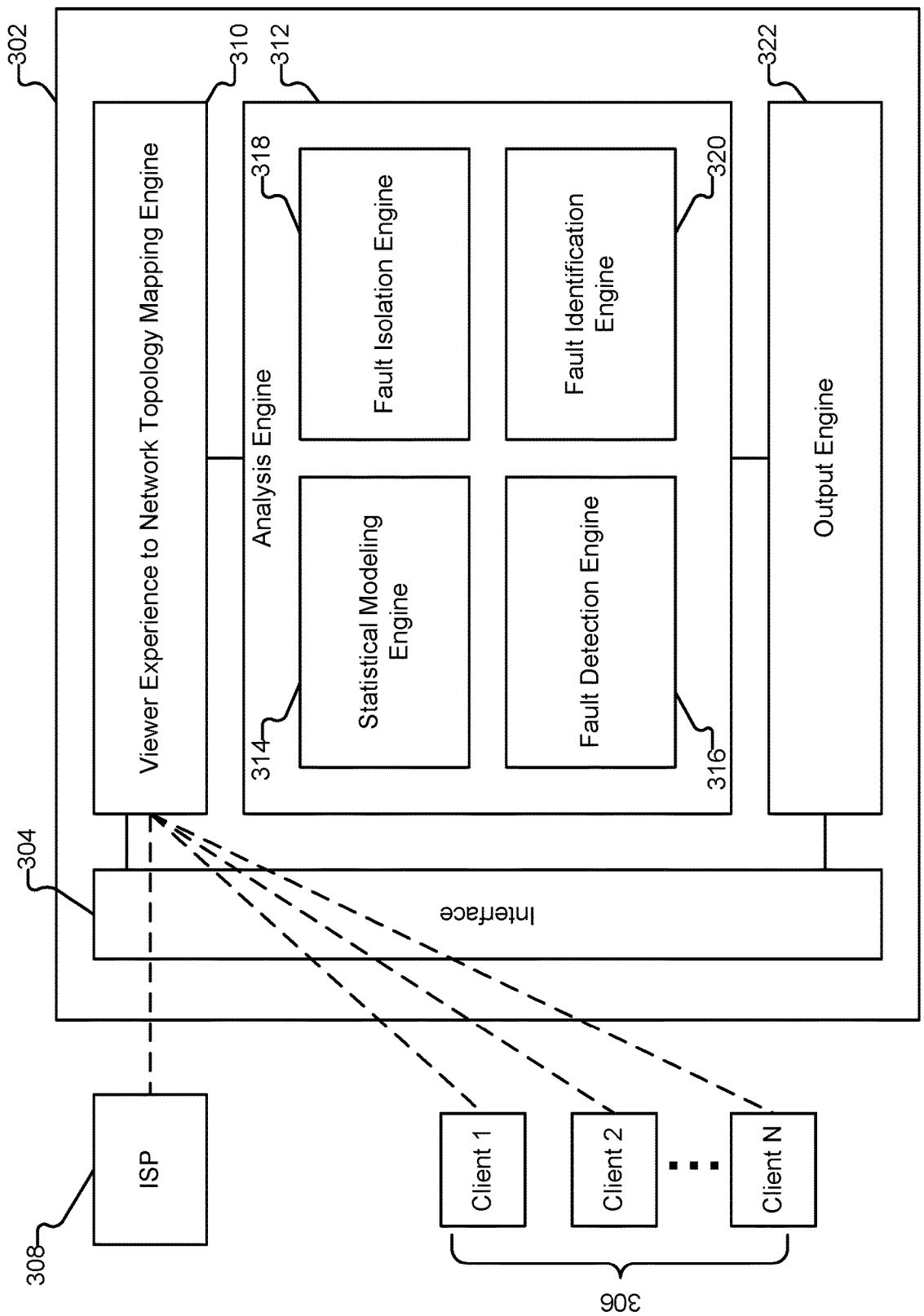
FIG. 3 illustrates an embodiment of a system for providing network insights.

FIG. 3 illustrates an embodiment of a system for providing network insights. Platform 302 is illustrated as a single logical device in FIG. 3, and can comprise standard commercially available server hardware (e.g., having a multi-core processor, 16+ Gigabytes of RAM, a set of one or more Gigabit network interface adaptors, and a set of one or more storage devices) running a typical server-class operating system (e.g., Linux). In various embodiments, platform 302 is a scalable, elastic architecture comprising distributed components, including components provided by one or more third parties (e.g., provided by Amazon Web Services).

Further, when platform 302 is referred to as performing a task, such as storing data or processing data, it is to be understood that a sub-component or multiple sub-components of platform 302 (whether individually or in cooperation with third party components) may cooperate to perform that task. In one example embodiment, platform 302 is implemented using Apache Spark and Scala.

In the example shown, viewer experience data is obtained or ingested (e.g., via network interface 304) by platform 302 from various remote clients 306 (also referred to herein as "end-points"). As will be described in further detail below, various video sites, applications (e.g., "apps"), devices, etc. can be instrumented.

In the example shown, remote clients 306 include content player applications used to playback content. In some embodiments, the remote clients also have installed a monitoring engine or module (either as part of, or separate from, the content player application) used to instrument (e.g., take measurements) of content playback at the client end-point. The monitoring engine is configured to collect measurement data associated with content playback sessions. As used herein, a session refers to an entity representing an instance of a user's playback interactions with a content asset. The session may begin with a user's request for a particular content, and end when the user ceases playing the content (e.g., the user stops watching a requested video).

In some embodiments, the monitoring engine is configured to measure and collect data continuously throughout the duration of a streaming playback session from end-points. For example, the monitoring engine is also configured to collect application performance and QoE (Quality of Experience) data at the end user session level. Examples of QoE metrics include buffering, bitrate, startup time, as well as event-based information such as failures/errors. The failures/errors can include video start failures (VSF), bitrate drops, rebuffering, etc. Another example of a session metric that can be captured is the playing time of the session.

The client device can be configured to transmit messages (also referred to herein as "heartbeat messages" or "simple heartbeats") to platform 302 throughout the duration of the session, where heartbeat messages include the measurements taken by the monitoring engine. In some embodiments, each session is associated with a session identifier. Each session (and heartbeats) can also be associated with the IP address of the client end-point. Each heartbeat can also be associated with a timestamp of when the measurement data was collected. In some embodiments, the heartbeat messages include a unique identifier assigned to the end-point (e.g., assigned at the time that a content player application was installed on the device). Platform 302 can then summarize the ingested data received from the client to create a summary of the session (e.g., aggregate metrics collected at various points throughout the session, for example, by determining average values of metrics, counts for events, etc.). As another example, the client can be configured to summarize the data for a session and send the session summary to platform 302.

In some embodiments, platform 302 associates (e.g., tags) each session experience summary with rich metadata, such as the device type, content type, geolocation, CDN, publisher, etc., which can also be obtained from end-points as well as via backend data ingestion by platform 302. As will be described in further detail below, platform 302 can also use common device identifiers such as IP addresses or various mobile device identifiers of end-user clients to associate network topology metadata information with a session (e.g., network topology metadata information can be associated or correlated with a session based on device identifiers that are found to be in common between the network topology metadata information and the session).

Platform 302 can obtain viewer experience data from numerous end-points (e.g., tens of millions of IP addresses on a single ISP). In some embodiments, platform 302 is configured to ingest the viewer experience data in real-time and perform the metadata tagging described above. As will be described in further detail below, the ingested viewer experience data can be correlated with network topology information to determine and provide network insights. In some embodiments, the correlation can be performed in real time as well.

In the example shown, platform 302 is also configured to obtain network topology information from a service provider such as ISP 308. For example, ISP 308 injects (e.g., uploads) into platform 302 an indication of a network topology structure such as that shown in FIG. 2. The ISP also provides platform 302 with a mapping of IP addresses (which the ISP assigned to end-points (e.g., homes)) to components (or paths including multiple components) in the network topology. Two examples of mappings are the following:

(1) ip_address or ip_address_range (CIDR) (v4 or v6)-> service group (naming following the structure above, e.g <svc_group_name/number>.<CMTS-name>.city.state.<man_name>)

and (2) ip_address (v4 or v6) or ip_address_range->fiber node (naming following the structure above, e.g <fiber_node_name>.<svc_group_name>.<CMTS-name>.<hub-name>.<man_name>)

As shown in the above examples, the ISP provides to platform 302 a mapping that specifies, for each end-point IP address (or range of IP addresses), the path (e.g., made up of a particular combination of network components in the topology) through the ISP's network topology by which content is distributed to the end-point. For example, the mapping can specify the names of the particular components in the network topology to which an IP address belongs.

The topology of the network and the mapping of network topology to IP addresses can be represented in a variety of ways, such as one file, or a set of files, that list each layer of the mapping.

In some embodiments, ISP 308 also provides to platform 302 low level information about the components in its network topology. For example, the ISP can provide utilization, capacity information (e.g., percentage utilization), or any other component health monitoring information associated with its network components, as appropriate. The low level component measurement data can also be associated with timestamps (e.g., to determine the utilization of a component at a particular point in time). As will be described in further detail below, such low level component measurement data can be used to identify the reasons behind issues in a network topology.

As described above, platform 302 obtains end user viewer experience data, where the viewer experience data is associated with the IP addresses or other common identifiers of the end users. Platform 302 also obtains a mapping of IP addresses or other common identifiers to network topology components. Viewer experience to network topology mapping engine 310 is configured to correlate or join the viewer experience data to network topology components by joining on IP addresses or other common identifiers. For example, a given video session obtained from a client end point includes the QoE metrics for the session and the IP address of the client (or the home that the client device is used at). The mapping of IP addresses to network topology can be used to determine that the given video session belongs to an IP address that belonged to a particular service group, that falls under a particular CMTS, which belongs to a particular hub, MAN, etc. Thus, the path (e.g., set of network components) inside the network via which content viewed in the session traversed can be determined. Thus, platform 302 can correlate a particular session experience with a particular set of network components used to deliver the content viewed during that session.

Once experience data is mapped to network topology, various types of processing can be performed, for example, to determine network insights. As described above, networks, while having access to low level information about their network components, typically do not have access to end-user experience (where a typical goal of networks is to provide a high quality end user experience), and thus it can be challenging to perform actions such as localized monitoring and alerting at the component level. Using the techniques described herein, such issues can be addressed.

In some embodiments, the joined or correlated viewer experience data and network topology mapping can be passed to and processed by analysis engine 312. In this example, analysis engine 312 includes statistical modeling engine 314, fault determination engine 316, fault isolation engine 318, and fault identification engine 320.

An end user's viewer experience can be determined based on whether the videos they watched were successful or failed. For example, an end user's viewer experience can be deemed as good if their video sessions were successful, while the viewer experience can be determined to be bad if their video sessions failed.

The success or failure of a video session can be determined based on the measurements of QoE metrics or events such as video start failure, re-buffering ratio, bitrate, etc., which are used to describe or characterize the quality of the experience of the video session. For example, a session can be labeled as a failure if any of the QoE metrics were determined to have failed, where failure of different QoE metrics can be defined in different ways. For example, a session can be determined or defined or labeled as a failure if a video start failure event occurred, or the session experienced high rebuffering ratio.

As another example, a session can also be designated or defined as a failure based on a comparison of a metric against a threshold (e.g., pre-defined or preconfigured failure threshold). For example, a session can be designated as a failure if the rebuffering ratio measured for the session exceeded a threshold (e.g., 2%), or if the bitrate for the session dropped below a threshold. Different thresholds can be used to define whether there are problems or failures with different metrics (e.g., different metrics can have corresponding or respective failure thresholds). Thus, the session as a whole can be designated as a failure if the session were to have failed along, or with respect to, any of the QoE metrics (according to their respective failure definitions, such as rebuffering ratio exceeding a threshold or a video start failure occurring, as described above). The session can be determined as successful if no failures occurred with respect to any of the metrics.

The occurrence of a session failure is not necessarily indicative of a problem with an IP address (representative of a home or end user or end point). For example, some session failures may occur randomly even when the network is behaving well or normally, or there are no problems.

Statistical modeling engine 314 is configured to use historical viewer experience session data to fit QoE measurement data to statistical models. For example, for each type of QoE metric, historical data for a given metric can be obtained from various sessions (with diverse attributes such as different publishers, CDNs, devices, etc.). The historical data for the metric across the various sessions can be fit to a statistical model. Once a statistical model has been fit to the observed historical data, the distribution of the metric can be determined.

Taking buffering ratio as an example, the probability of different buffering ratio values being observed in sessions can be determined based on the statistical model fit to the rebuffering ratio data across numerous sessions. For example, using the distribution, the probability of rebuffering ratio exceeding a threshold (i.e., the probability of any given session failing on, or with respect to, rebuffering ratio) can be determined. This provides an understanding of the likelihood or expected probability or failure rate of sessions based on rebuffering ratio exceeding a failure threshold under typical conditions (e.g., when there is no abnormality or problems with the IP address, network, etc.). Thus, the baseline or normal behavior of the metrics across numerous sessions can be determined. As will be described in further detail below, deviations from the baseline or expected behavior for the metrics (calculated based on the statistical modeling described herein) can be used to determine whether the IP address is behaving abnormally, for example, to determine whether there is a problem that should be further explored.

Many factors can affect the different statistical models to which each QoE metric can be fit. For example, when the number of sessions is sufficiently large, the average playtime of the group of sessions would follow a normal or Gaussian distribution (according to the central limit theorem). Additionally, the majority of videos (both VoD (Video on Demand) and live events) have a fixed length, where the distribution of play time of a session may peak around the length of the view if the majority of viewers have finished watching the content from beginning to end.

Similarly, given a sufficient number of sessions, the average rebuffering time for a session also converges to or follows a Gaussian distribution. However, consider the average rebuffering ratio, which in one example embodiment, is defined as follows:

$$\frac{\text{sum (rebuffering time)}}{\text{sum (rebuffering time + play time)}}$$

The average rebuffering ratio for a session may follow a more complex distribution. For example, for short video sessions, because the play time may be small and buffering time may also be small, the ratio may not converge properly. However, if play time is much longer in comparison to the buffering time, the above formula can be rewritten as follows:

$$\frac{avg \text{ (rebuffering time)}}{avg(\text{play time}) + avg \text{ (rebuffering time)}}$$

which will converge more closely to a Gaussian distribution (when average play time is large and stable, hence the above distribution is mostly determined by the average rebuffering time).

Another example factor that can affect the statistical models to which metrics are fit is that the distribution for some of the video QoE metrics may have tails that are long and fat.

In one example embodiment, the metric Video Start Failure (VSF) can be modeled by Bernoulli trials (where the percentage of VSF is typically low, such as 0.5%), where the VSF percentage of a set of sessions follows the binomial distribution.

Different metrics can be fit to different statistical models. For example, while VSF may best fit with a binomial distribution, other metrics such as rebuffering, bitrate, etc., may best fit with other types of statistical models.

The statistical modeling can be performed with respect to different levels in a network topology. For example, statistical modeling can be performed at the IP address (e.g., home) level, service group level, CMTS level, hub level, MAN level, etc. For example, for each node in a network topology, session summary data associated with IP addresses under the node are aggregated. Statistical models are then fit to the QoE metrics for those sessions under the node. Thus, distributions and session failure probabilities can also be determined for specific components in a network topology (e.g., the baseline probability of any given session under a node failing can be determined).

As one example, a baseline failure rate for any session in a particular service group is determined by obtaining experience data for sessions in the particular session group (e.g., experience data for sessions associated with IP addresses that belong to the particular service group). A statistical model is fit to the session experience data for the service group (where different statistical models can be applied for different types of QoE metrics). A baseline failure rate (e.g., with respect to a metric to which a statistical model is fit) is then determined for any given session in the service group, for example, under normal conditions where the network is functioning well. Similarly, a baseline failure rate/probability for sessions under a particular CMTS may be determined by fitting metrics measured for sessions under the particular CMTS to statistical models.

Thus, statistical modeling can be performed at various levels of granularity for a network In the examples described above, statistical models were fit to each type of QoE metric. In some embodiments, an aggregate metric, referred to herein as a quality experience score, is determined, which is an aggregate of the various QoE metrics collapsed into a single score (e.g., an aggregate composite score for a session that is a function of the QoE metrics for the session). The score can be associated with a failure threshold that defines what score indicates a session failure. A statistical model can be fit to overall scores associated with various sessions. Using the score threshold and the statistical modeling, the probability of a session failing with respect to the score may be determined, as described above. Statistical modeling of the overall/composite score can be determined at various levels of granularity as described above.

The statistical modeling can also be performed for session data over a configurable window of time that can span different time scales (e.g., last week, last month, last year, etc.)

Fault detection engine 316 is configured to determine the existence of an issue or problem with content delivery. The existence of an issue (e.g., problematic IP addresses) can be determined by evaluating ingested viewer experience data using the statistical models generated for metrics using statistical modeling engine 314, as described above. Techniques such as hypothesis testing and deduction can be used to determine whether nodes in the network topology (or factors outside of the network topology) are problematic.

For example, suppose that based on the statistical modeling of historical video start failures observed from numerous clients sessions, it is determined that the rate of video start failures for any session is typically only 1% if the network is performing normally (as determined using the statistical model fit to observed VSF metric data using statistical modeling engine 314, as described above). However, recent video sessions for a particular IP address are observed to have failed at a rate of 5% in a relatively large number of video sessions. This indicates that the failure rate for this IP address is outside the normal failure rate (as determined using the statistical model), and that there may be a potential issue or problem with the IP address. As will be described in further detail, an analysis of IP addresses determined to be problematic can be used to isolate faults. For example, suppose that VSF failure rates are typically evenly distributed across sessions. While, the problems with a problematic IP address may be due to home cable modem, home wifi, if it is observed that problematic IP addresses are focused or clustered in a particular service group, (e.g., five out of ten homes in the same service group are identified as being problematic), then this deviation from baseline or expected behavior may be indicative of a potential fault or issue with the particular service group (e.g., it is unlikely that five of the ten homes in the same service group would be independently problematic, and thus, it can be inferred that there is a problem at a higher level above the home IP addresses, such as at a higher level component in the network hierarchy or outside the network).

For example, based on the distribution calculated using the statistical modeling described above, a baseline for failure rates can be determined. The further away that observed failure behavior deviates from the baseline, the higher the likelihood that there is a problem. Confidence intervals (e.g., 95%, 97%, 99% etc.) can be used to determine whether there is a problem.

Fault isolation engine 318 is configured to isolate, in the network topology, the location or source contributing to the determined issue. As described above, end user experience (measured based on session QoE metrics) can be mapped to different paths (e.g., sets of components) inside a network. The mapping can be used, along with statistical modeling, to perform a correlation of problems observed at client end points with components in the network.

As will be described in further detail below, the viewer experience data obtained from client end points, as well as the statistical modeling described above can be used to infer, deduce, or isolate the location of faults or issues in the network topology. For example, fault isolation engine 318 is configured to statistically infer the likelihood of a particular component (or components) in the network having failed, for example, based on the statistical likelihood of problems occurring at IP addresses belonging to or included under the component in a network topology (e.g., correlating problems detected at IP addresses to components in a network topology). Thus, problems can be identified and localized to the source (e.g., specific component) of the problems.

Using the techniques described herein, faults can be isolated at a network component level granularity. For example, rather than determining that there appears to be performance issues with a portion of a network associated with a particular city, platform 302 can isolate faults or issues at a much finer granularity, for example, determining that there is an issue or fault with a particular service group in a CMTS in a hub in the city. For example, suppose that it is observed that three IP addresses within the same service group have suffered session failures within the same period or window of time. It can be determined that the probability of three IP addresses within the same service group failing at the same time independently is low (based on the statistical modeling described above), and thus, a problem at the service group level (e.g., port on the CMTS to which the service group belongs) can be inferred. If it is inferred that there is a problem with the service group (where the service group can be labeled as being bad or having failed), the next level of the network topology, CMTS, can be evaluated to infer whether there is a problem with the CMTS (e.g., by determining whether there are problems with IP addresses in other service groups under the CMTS that deviates from normal behavior), Problems with other components can be probabilistically inferred by moving up the levels in a network topology.

Various fault isolation techniques can be used. In some embodiments, fault isolation includes using the diverse data ingested from clients to isolate issues. For example, data points for a subset or sample of the clients can be selected from the population of diverse global client information and partitioned in a manner such that all factors or attributes associated with the selected data points are the same except for one factor that is being isolated for analysis.

An example of such a fault isolation methodology or technique is as follows.

First is a setup step. In this step, attributes that impact experience are identified. For example, sessions may be associated with various attributes such as publisher, CDN, device type, IP address. The attributes can further include network components or nodes in a service provider's network (identified based on session data to network topology correlation using IP address, as described above), such as cable modem, service group, CMTS, hub, MAN, etc. in a cable network. Any of these attributes may impact experience.

An attribute is selected for experimentation. Traffic (e.g., content playback sessions) is split or divided into control and experiment group, where only the selected attribute is allowed to change (i.e., values for a particular attribute under analysis or experimentation are allowed to vary while the values for all attributes are fixed). For example, suppose that each viewer experience data summary for a session is associated with the attributes of publisher, CDN, device, and service group. Suppose that the attribute that is isolated for analysis is the service group. Clients that share the same values for all attributes except for the service group are selected (e.g., viewer experience data for sessions that share the same publisher, CDN, and device, but not service group). As will be described in further detail below, in additional iterations of fault isolation analysis, the selected experiment attribute can be evaluated for different combinations of fixed attribute values.

In a second step, fault candidates are identified. For example, QoE metrics are analyzed between the control and experiment groups. In some embodiments, an alert is triggered when a QoE metric for the experiment group is substantially worse than the control group (e.g., based on the related statistical models).

In a third step, the fault alerts are aggregated and validated. This can include aggregating and ranking attribute values by alerts. For example, attribute values can be aggregated and ranked based on the number of alerts that were triggered when a metric for the experiment group is substantially worse than the metric for the control group. In some embodiments, the aggregation is performed along different attributes (e.g., aggregating the alerts by CDNs only, or by combinations of CDN, publisher, and device combination, etc., and then ranking the aggregated alerts to identify which aggregations may be associated with more alerts. In some embodiments, confidence intervals are calculated to ensure that possible faults are identified with high confidence.

In some embodiments, the three steps above are repeated for all attributes and values. For example, for the same experimentation attribute, another combination of fixed attribute values are selected (i.e., controlling for another combination of fixed attribute values). This allows the experiment attribute to be evaluated for different combinations of values for the fixed (control) attributes. The fault isolation process can be repeated for different experiment attributes as well, in order to isolate the locations of faults. Examples of fault isolation are described in further detail below.

An example implementation of the above fault isolation methodology is as follows.

First, problematic paths within an ISP network are identified. This can include labeling each video session as "good" or "bad" based on the QoE metrics for a given session (e.g., video start failure, rebuffering ratio, bit rate, etc.). For example, if a session could not play a content item due to errors, it is marked as "bad." As another example, if a session had a high rebuffering ratio (e.g., 2%), then the session is also marked as bad. In some embodiments, the fault isolation analysis is performed according to a particular metric. For example, failure is determined according to a single selected metric (e.g., label "bad" based on failure according to joined/nonjoined). Session failure can also be determined according to multiple metrics (e.g., using a composite score as described above that is an aggregate of multiple metrics).

The labeling of a session as either "bad" or "good" (or not bad) can be used to simulate a Bernoulli trial, resulting in a distribution of the percentage of bad session in a group that follows a binomial distribution. As a result of this first step, candidate network nodes are detected, where the candidate nodes include nodes that are on a "bad" path of components in the network topology (e.g., network components or nodes in a network topology which IP addresses associated with bad sessions fall under).

In a second step, bad candidate nodes are selected. For example, based on the above modeling (e.g., of a binomial distribution, as described above), a determination is made as to whether the observed percentage or proportion of bad nodes is by chance (e.g., random chance), or there is an actual or real issue with high confidence (e.g., 95% confidence) with the candidate nodes. In some embodiments, the determination is made based on threshold probabilities.

For example, suppose that a particular service group is a candidate node (because it is along the path that leads to an IP address that had a "bad" session). Suppose that the probability of a bad session occurring independently in this service group is 8%. In some embodiments, the failure rate is determined with respect to the metric (or metrics) used to label sessions as bad or good. For example, if the sessions were labeled as "bad" or "good" based on whether they started up properly or not, then the probability of a session in the particular service group being start up failure is obtained using the statistical modeling described above (e.g., where the failure probability can be determined at various levels of the network topology, such as at the service group level).

The probability that a service group is bad, given that four out of five sessions contained in the service group (where sessions can be mapped to service group by IP address) are bad, is P(service group is bad)=99%, while if 1 out of 3 sessions is bad, then the probability that the service group is bad is 78%. If 95% probability (e.g., confidence level) is used as a threshold, then for the first case, the service group would be classified as "bad," while in the second case, the service group would not be labeled as bad. Thus, as a result of this second step in this example, candidate bad nodes in the network topology are marked for further analysis based on the above described threshold.

In a third step, bad combinations of CDN, device, and publisher (e.g., factors outside of a network) are identified. For example, for each combination, the sessions which belong to the candidate nodes are removed. In some embodiments, this is to remove the influence of external factors on the entities (e.g., network topology component nodes) that are being examined. For example, suppose that from the above steps, it is known that a particular combination of CDN1, device1, and publisher1 are experiencing performance issues, and one particular service group is being examined, then all the sessions with the same combination attributes of CDN1, device1 and publisher1 will be removed first. Then the confidence of the service group being problematic using the remaining sessions is calculated. As one example, combinations with confidence exceeding 95% are considered "bad" combinations. This is one example embodiment of a conservative way to remove the external factors in analyzing the entity (node), because it is possible that both the external and internal factors of the entity (node) being examined are affecting the QoE of the sessions.

Thus, bad combinations of factors external to the network can be identified. For example, while a node in a network may be marked as problematic because the observed failure rate in the node significantly exceeded a baseline failure rate for the node, the source of the problem may not be the node itself, but a CDN, device, and/or publisher outside of the network. In step 3, bad combinations of CDN, device, and/or publisher can be isolated.

In a fourth step, bad nodes are identified and sessions are labeled with root causes. For example, for each candidate node in the network topology, the sessions corresponding to bad combinations, as found in the above third step, are removed. The resulting sessions include those under the node that were not affected by external factors (e.g., external factors have been removed or eliminated as possible causes for poor QoE for sessions under the node). The confidence of each candidate nodes is then calculated using the remaining sessions. Nodes with confidence exceeding 95% are considered bad nodes (e.g., the node itself is determined to be problematic). Each session is then labeled with a root cause explaining why the session was "bad", where the root cause can be determined using fault identification engine 320, described in further detail below.

In the above, statistical inference was used to isolate faults to components in a network. As another example, comparison of problematic IP addresses and their attributes can be used to deduce the location of problems in a network. As with the statistical inference technique described above, the deduction described herein can also be used to determine whether there are problems outside of the ISP, such as with publishers, CDNs, and certain device types. The aforementioned statistical inference and the deduction described below can be used together or separately when performing fault isolation, are used separately.

For example, as described above, suppose that from a pool of observed data, problematic IP addresses are determined. It is then determined whether the fault of the problems can be deduced to be localized to the service group to which the problematic IP addresses belongs.

In addition to QoE metrics, each video session can be associated with a set of attributes, such as publisher (of content viewed during session), CDN (via which the content was delivered), device type (of end point playing back the content), as well as network topology path (e.g., service group, CMTS, hub, MAN, inside of the end points ISP through which the content traversed).

In order to deduce whether the fault for the problematic IP addresses lies with a particular service group, sessions that have all of the same attributes except for service group (the attribute being evaluated) are obtained (i.e., sessions that have the same publisher, CDN, device type, CMTS, hub, MAN, but different service groups are obtained).

For each of the identified sessions, which vary only on service group, the metrics for a given session are evaluated (e.g., according to a metric failure definition, such as a comparison against failure thresholds, as described above). If the session failed on any of the metrics (or some combination of the metrics, as applicable, according to a session failure definition), then the session is labeled as "bad" (or some other representative label or designation). Sessions that were successful are labeled as good.

For illustrative purposes, suppose, for example, that the three below sessions with the following attribute values, metrics, and good/bad label are identified as described above.

TABLE 1

| Publisher | CDN | Device Type | Service Group | Metric 1 | Metric 2 | Label |
|---|---|---|---|---|---|---|
| P1 | C1 | D1 | S1 | M11 | M12 | Good |
| P1 | C1 | D1 | S1 | M21 | M22 | Good |
| P1 | C1 | D1 | S2 | M31 | M32 | Bad |

In the example table above, the three sessions differ only on service group. Those sessions associated with IP addresses in service group 1 were all good, while only the session associated with an IP address in service group 2 was bad. Thus, when there are enough sessions for service group S2 similar to the last row, and enough sessions belong to other services groups similar to the first two rows, it can be deduced that the problem or source of problems is with service group 2, for example, again using the statistical modeling and confidence interval calculation with selected thresholds, as described above to validate the analysis.

Thus, faults in components within and without the network can be deduced while excluding all other factors, as described above.

Thus, the components in the network topology that may have caused the problems observed in sessions at end points (IP addresses) can be isolated or predicted. In some embodiments, observed problems at end points can be classified based on the isolated source of the problem. For example, platform 302 can determine the proportion or percentage of problems that were caused by home networks, the percentage of problems caused by service group, the percentage of problems caused by CMTS, the percentage of problems caused by CDNs, the percentage of problems caused by publishers, etc.

Fault identification engine 320 is configured to determine a root cause or explanation for the fault. For example, if a specific component inside a network is isolated using fault isolation engine 318, low level information about the specific component can be used to determine how and why the component contributed to or resulted in the issue identified using fault determination engine 316.

As one example, an overload threshold can be determined for a component. For example, suppose that a fault is isolated to a particular service group. While the service group may be functioning (e.g., it is not down), it may be that there was too much traffic flowing through the service group, which affected end users' experience. The utilization or capacity of the service group at the time of the issues with the IP addresses under the service group can be obtained from the network service provider. This value can be used to facilitate determination of an appropriate overload threshold for the service group.

For example, suppose that the network provider, without insight into the impact of network components on end user experience, set the overload threshold for the service group to be 90%. Without the correlation of end user experience to network components described herein, it would be challenging for the network to determine whether the 90% overload threshold is appropriate. Using the techniques described herein, platform 302 can determine, for example, that problems emerge for IP addresses when the service group's load reaches 77% (problems are correlated with a load of 77%). The network provider can then be recommended to set or change their overload threshold from 90% to 77% in order to improve end user experience. Thus, platform 302 can determine whether problems experienced at end points are associated or correlated with high or low utilization of components such as shared infrastructure (e.g., switches, links, etc.). By correlating low level node metrics with end user experience using the techniques described herein, networks can then be provided insights into how the operational state of their network nodes impacts end user experience. Recommendations can also be provided for how the ISP can improve their network.

As another example, if the fault of issues with IP addresses is isolated to specific cable modems installed at the homes of subscribers, information about the cable modems, such as signal-to-noise ratio, can be used to determine whether problems are correlated with low signal-to-noise ratio.

Temporal analysis can also be performed to determine whether observed problems are correlated with peak or normal hours. For example, the information about each monitored session can also include a timestamp associated with the session. The time of day indicated by the timestamp can be used to determine whether issues (at various levels of granularity in a network topology) are correlated with peak or non-peak hours.

Output engine 322 is configured to provide output based on the analysis performed using analysis engine 312. For example, recommendations and alerts can be generated by output engine 322.

As one example, recommendations or alerts can be generated based on the fault identification described above. For example, alerts can be generated by platform 302 and used by network operators, where the alerts are generated based on the low level measurements at various components in the networks. For example, for every port on a CMTS (where a port corresponds to a service group), bandwidth utilization can be monitored. If the utilization exceeds a threshold (as described above), this may increase the probability of congestion of that port. An alert can be generated and provided to the network operator based on the threshold having been exceeded.

Similarly, signal to noise ratio of each fiber node in a network can be monitored. If the signal-to-noise ratio exceeds a threshold (increasing the probability of a problem for an end viewer), an alert indicating the poor signal-to-noise ratio can be raised.

Output engine 322 can also be configured to provide competitive studies or analysis of network providers. For example, suppose that multiple ISPs utilize the services provided by platform 302 to obtain insights into their respective networks. Platform 302 can perform a competitive analysis of the network providers to determine which ISPs are providing better end user experience, and which ISPs need improvement (e.g., relative competitiveness of ISPs based on end user experience or identified faults in the networks). The information provided to ISPs can be provided at different levels of granularities. For example, suppose that based on a competitive analysis, it is determined that subscribers to a first ISP can stream content at 2 Mbps (Megabits per second) while subscribers on a second ISP can stream content at 3 Mbps. Platform 302, using the techniques described above, can indicate why the subscribers on the first ISP are experiencing slower streaming speeds, for example, due to issues with capacity identified in specific components that are causing switching down of bitrates.

The reports provided to an ISP can provide various insights into the ISP's network, such as analysis of what components are believed to be affecting end user experience, the reason or cause for poor end user experience (e.g., over utilization), etc. Recommendations can be made at a component level granularity for how the ISP can improve its networks by identifying issues at various levels of the ISP's network.

As described above, faults can also be localized to publishers or CDNs, which can also be provided reports indicating how they are impacting end user viewer experience.

Various examples of dashboards and reports that can be generated by output engine 322 will be described in further detail below.

In the above example embodiment of FIG. 3, network components and session QoE metrics were correlated or joined together based on IP addresses found to be in common. In other embodiments, other types of identifiers, such as device identifiers (e.g., Media Access Control (MAC) address, International Mobile Equipment Identifier (IMEI), etc.) can be used to correlate user experience with network topology.

Figure 4:
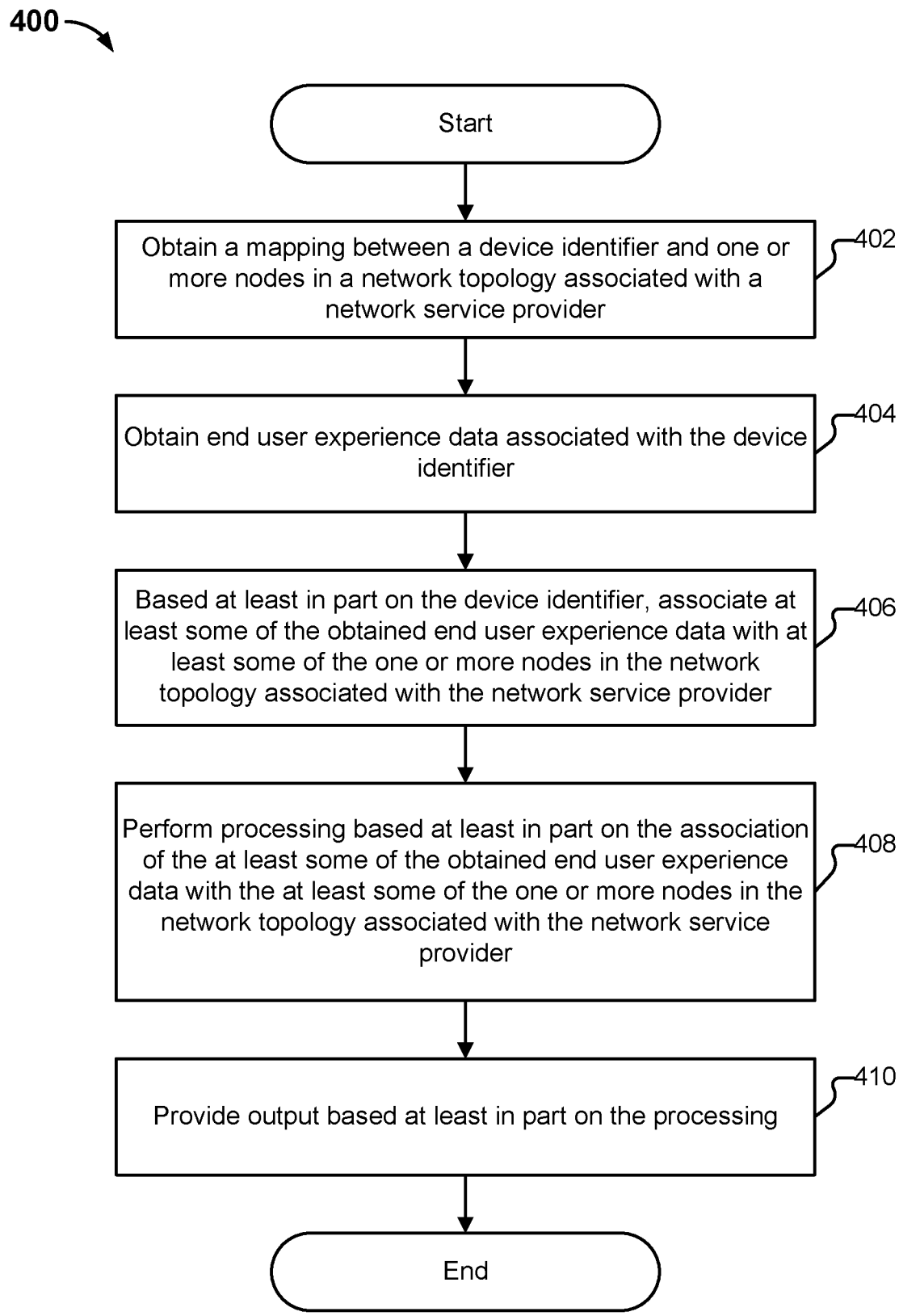
FIG. 4 is a flow diagram illustrating an embodiment of a process for providing network insights.

FIG. 4 is a flow diagram illustrating an embodiment of a process for providing network insights. In some embodiments, process 400 is executed by platform 302. The process begins at 402, when a mapping between a client (e.g., device) identifier and one or more nodes or components in a network topology associated with a network service provider is obtained. For example, a network provider such as an ISP provides a mapping of the relationship between IP addresses (which the network provider assigned to end points) to the components in the network topology under which those IP addresses are included. Other examples of client device identifiers include Media Access Control (MAC) addresses and International Mobile Equipment Identifiers (IMEIs). In some embodiments, the mapping is associated with a particular period of time. The mapping may be dynamic (e.g., when an ISP dynamically assigns new IP addresses to end-points on a time driven basis (e.g., periodically or with some frequency)) or static (or relatively static if the mapping does not change for long periods of time).

At 404, end user experience data associated with the client device identifier is obtained. For example, QoE metrics associated with content playback sessions are obtained from remote clients. The experience data for a session may also be associated with an identifier (e.g., IP address, MAC address, IMEI, etc.) of the client on which a session was played. The QoE metrics can include metrics relating join status of the session, video start failures, buffering ratios, bit rate (e.g., bit rates at which content was streamed or played, changes in bitrate, etc.).

At 406, based at least in part on the client device identifier, at least some of the obtained end user experience data is associated with at least some of the one or more nodes in the network topology. As one example, the end user experience data is mapped or correlated or joined to the network topology by IP address. For example, based on IP address, each session is matched to a set of components in the network topology, where the components make up a path through which content traversed inside the network to arrive at the client that started the content playback session. This is performed for example, by taking a session, obtaining the IP address associated with the session, and using the session to lookup, in the mapping provided by the network provider, the components in the network that included the IP address. The session experience data is then joined to the corresponding network components for the IP address found to be in common between the two sets of data (end user experience data and mapping of device end-points to network topology nodes). Correlation or joining of end user experience with network topology can be performed using other types of identifiers, such as MAC addresses and IMEIs.

At 408, processing is performed based at least in part on the association. In some embodiments, the processing includes performing statistical modeling of the experience data. The statistical modeling includes fitting statistical model(s) to the session experience data. As described above, each type of QoE metric measured for sessions may be associated with a different statistical model. The statistical modeling can be used to determine a distribution of data for the metric. Based on a definition of failure for a metric, a baseline rate of failures for sessions according to a given metric can be determined. Each metric may be associated with a corresponding different failure definition. For example, for event-based metrics such as joining, a session can be defined as having failed if it did not join. As another example, for another metric such as buffering ratio, a session can be defined as having failed if it experienced a buffering ratio of greater than 2%. Baseline failure rates for each type of metric can be obtained from the distributions computed for those metrics using the different statistical models fit to the metrics (e.g., determine from the distribution the probability of a session failing according to the failure definition for the metric). The statistical modeling can be performed at specific granularities within a network. For example, for a cable network, statistical modeling can be performed on the network as a whole, at the MAN node level, at the hub node level, at the CMTS node level, at the service group level, and/or the IP address node level by fitting statistical models to metric data aggregated to the level of interest (e.g., where different failure rates may be determined for different levels or nodes in the network topology). Statistical modeling can also be performed across different windows or intervals of time, for example, by aggregating data within a particular period of time.

In some embodiments, the processing performed at 408 includes performing fault isolation. For example, nodes in the network topology, or factors external in the network topology, can be evaluated or analyzed to determine the location of faults (that are causing content playback sessions to fail). The source of a fault can be determined using statistical analysis such as the hypothesis testing described herein, linear regression, logistic regression, Bayesian networks, ranking distribution comparison, or any other appropriate statistical analysis. The statistical analysis may rely on the statistical modeling of metrics as described above. For example, the statistical modeling can be used to determine baseline distribution or failure rates at various levels of granularity in the network topology. A sample of observed session summary data can be obtained. The distribution or failure rate of the observed number of failures in the sample can be compared against the baseline distribution or baseline failure rate. If the distribution of the sample or the probability of the sample failure rate deviates from the baseline distribution or failure rate by a threshold, then the node can be determined to be problematic. Further analysis of such nodes can be performed to determine whether the source or cause of the problems is the network node itself, or some combination of external factors such as in-home network (e.g., modem or wireless router in a home of a subscriber), CDN, device type, geolocation, and/or publisher, as described above.

As described above, fault isolation may include using diverse data, such as session summary data collected from various client end points to isolate issues by using a large amount of data, as well as by selecting data points and partitioning the data such that all factors are same except one factor that is isolated for analysis.

For example, as described above, attributes impacting experience (e.g., network nodes, publisher, CDN, device type, geolocation, etc.) are identified. An attribute is selected for experimentation. Traffic (e.g., session data) is split into control and experiment groups, where only the attribute selected for experimentation is changed.

Fault candidates (e.g., candidate problematic nodes) are then identified. QoE metrics between control and experiment groups are analyzed. Alerts are triggered when a metric for the experiment group is substantially worse than the control group, where the determination of how much worse the metric is for the experiment group as compared to the control group can be determined based on the statistical modeling of the metric, as described above. For example, alerts can be triggered when a failure rate for a QoE metric in the experiment group exceeds a baseline failure rate for the metric in the control group.

Fault alerts are then aggregated and validated. For example, attribute values are aggregated and ranked by alerts. Confidence intervals are calculated to make sure that possible faults are identified with high confidence.

At 410, output is provided based at least in part on the processing. For example, recommendations or alerts can be generated using low level information about the components determined to be problematic. The low level information can include node performance information, such as various types of resource utilization information, signal-to-noise ratio information, error related information associated with the node, etc. As described above, such node performance information can be used to determine why the node is impacting or affecting end user experience. Examples of output are described in further detail below.

Additional Details

Example Fault Isolation Scenario

The following is an example scenario in which fault isolation is performed. In some embodiments, the fault isolation described below is performed using platform 302. In the example below, evaluation of a content delivery process is performed. This includes evaluating the inside of an ISP's network, for example, finding bad paths in the ISP and identifying bad nodes from candidate nodes that are potentially bad. Problems can also be isolated outside the ISP's network, such as isolating problems caused by CDN, device, publisher, etc. In the below example, a cable network will be evaluated to determine network insights.

The process described in the following example includes: identifying problematic candidate nodes in a network topology; selecting bad nodes from the candidate nodes; considering other factors such as CDN, device, and publisher that are outside of the network; finding frequent patterns; and labeling nodes with a root cause.

Identifying Problematic Candidate Notes

Figure 5A:
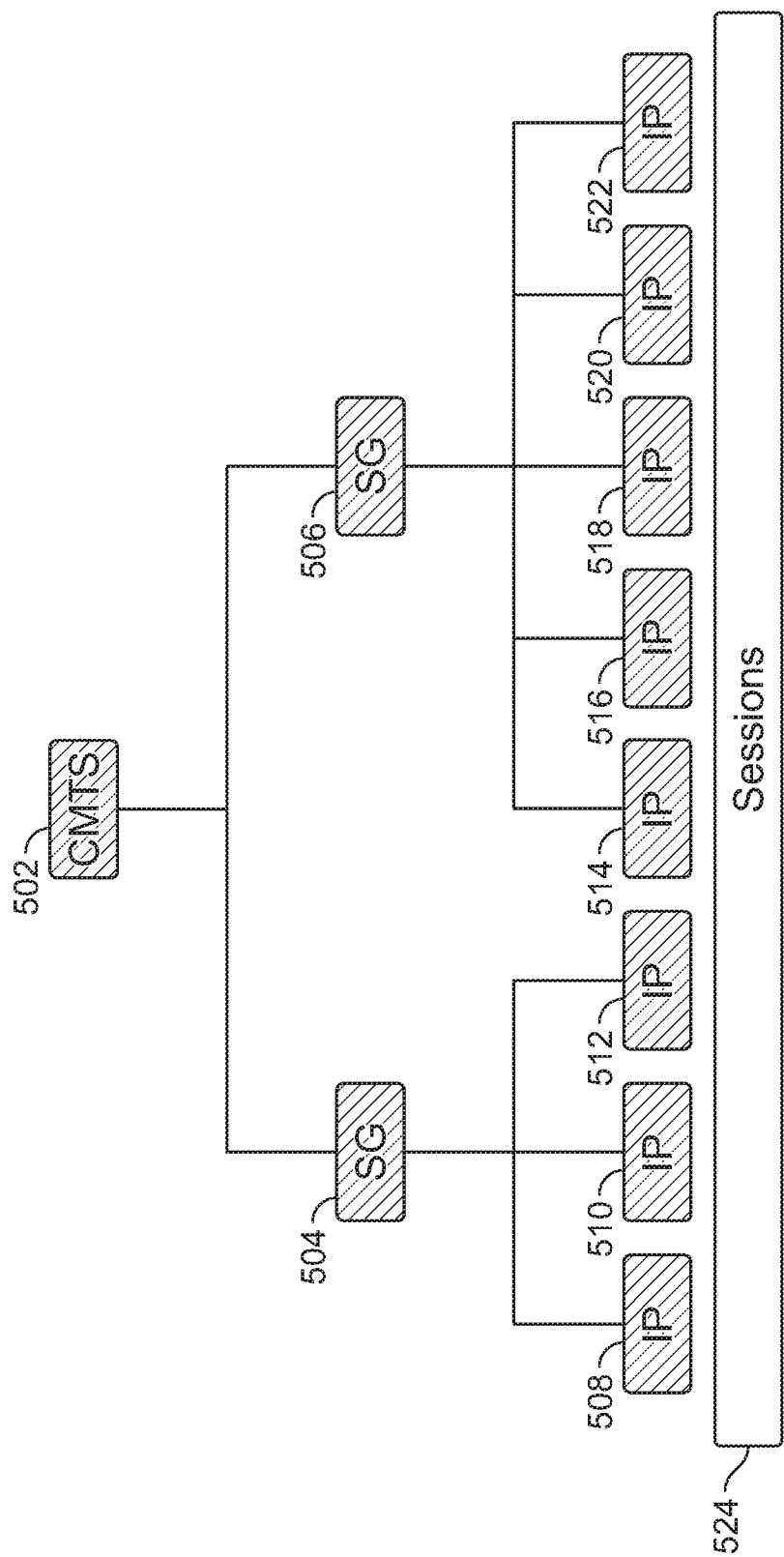
FIG. 5A illustrates an example embodiment of a portion of a network topology.

FIG. 5A illustrates an example embodiment of a portion of a network topology. At the top of the portion of the hierarchy shown is a CMTS 502. Below the CMTS are SG (service group) 504 and SG 506. In this example, SG 504 includes IP addresses 508-512, and SG 506 includes IP addresses 514-522. Sessions 524 represents content playback sessions associated with IP addresses 508-522 (e.g., sessions played by client devices associated with IP addresses 508-522). In this example, platform 302 labels each session as a success or a failure based on metrics and/or events such as joined/nonjoined, buffering ratio, bitrate, etc., as described above.

Figure 5B:
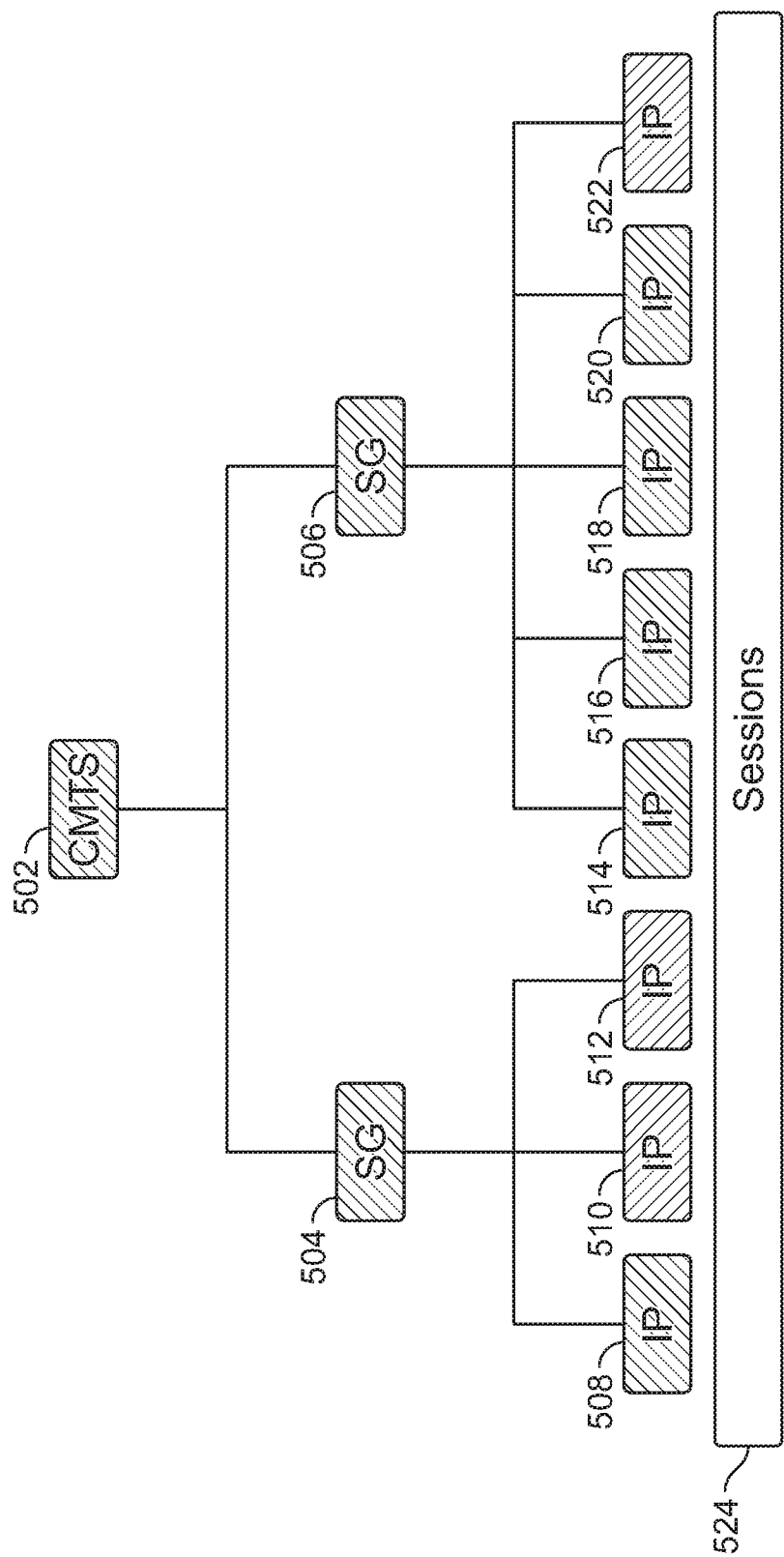
FIG. 5B illustrates an example embodiment of identifying problematic candidate nodes.

FIG. 5B illustrates an example embodiment of problematic candidate nodes being identified in the portion of the network topology shown in FIG. 5A. In the example shown, IP addresses 508, 514, 516, 518, and 520 are identified as problematic candidate nodes (e.g., because the sessions associated with the IP addresses are determined to have been failures). Service groups 504 and 506, as well as CMTS 502 are also identified as problematic candidate nodes because they are higher level nodes in the network topology under which the problematic candidate IP addresses fall (e.g., any of those nodes may be the source of the observed session failures).

Figure 5C:
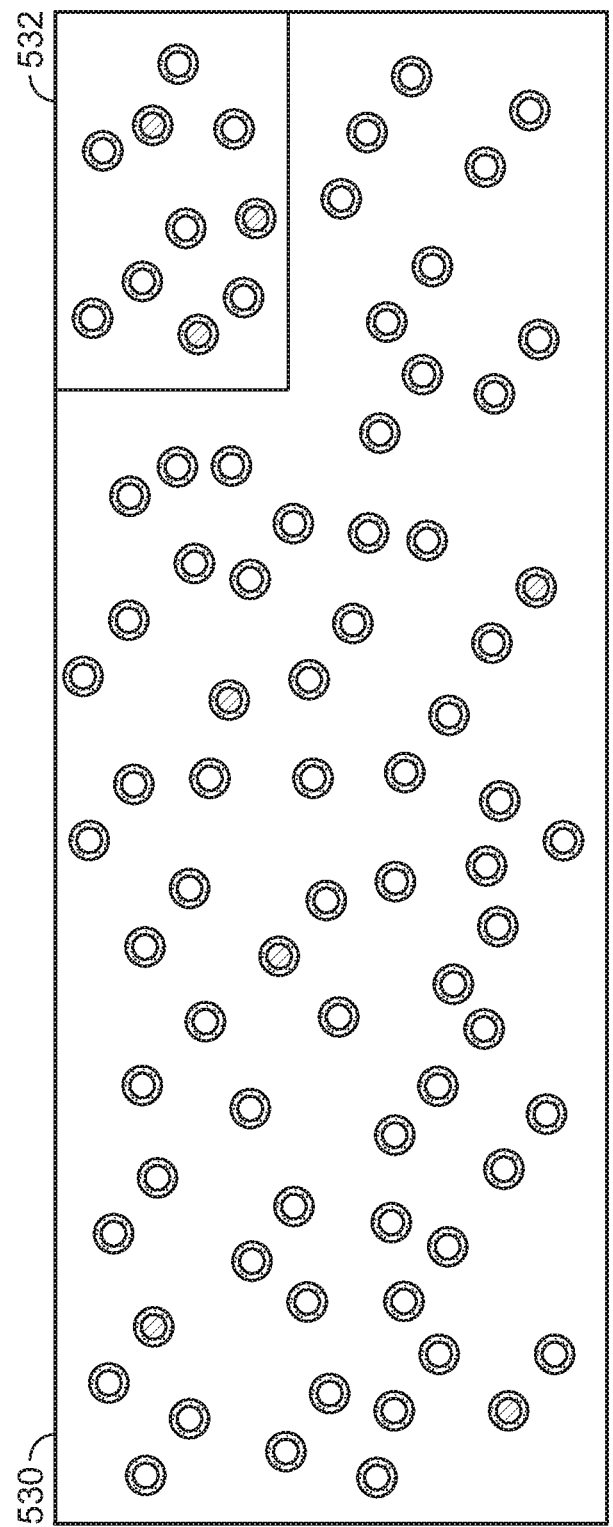
FIG. 5C illustrates an example embodiment of identifying problematic candidate nodes.

FIG. 5C illustrates an example embodiment of identifying problematic candidate nodes. In this example, ignoring the network structure or topology, a pool of sessions 530 is obtained from historical data. Suppose that each session is independent of each other, and that the failure rate for any session is 0.08 if the network is good, where 0.08 is a baseline value determined using the statistical models fit to metrics, as described above. In this example, the fault isolation analysis is performed with respect to a particular type of metric, and the probability of 0.08 is a baseline probability of a session failing according to the particular type of metric. Fault isolation can also be performed to other metrics (which may have different baseline probabilities of failures based on their respective statistical modeling). Multiple metrics can also be considered for fault analysis (e.g., using composite metrics, as described above). The baseline probability may also be with respect to a particular level of interest in the network topology (e.g., particular node in the network topology), such as a probability of failure for a session in a given IP address, a probability of failure for a session in a given service group, a probability of failure for a session in a given CMTS, hub, MAN, etc.

In this example, suppose that a sample (532) of the pool of sessions is obtained. The sample is a sample of 10 sessions associated with one of IP addresses 508 and 514-520 that have been identified as being on the path of the sample sessions (e.g., the sessions fall under a particular IP address, which is a node in the network topology). Suppose that of the sample of 10 sessions under the IP address, 3 sessions are labeled as failures. In this example, an analysis is performed, based on the sample, to determine whether the IP address should be marked as a candidate problematic IP address (i.e., is the failure rate of the sessions under that IP address larger than 0.08?). In this example, because each session is labeled as a success or failure, the session successes/failures can be modeled by using Bernoulli trials, where the session success/failure will converge to a binomial distribution.

For a random variable that follows the binomial distribution, the probability of achieving x successes in n trials is given by:

$$P(x) = \binom{n}{x} p^x q^{n-x}$$

where:
p=P(success) on a single trial
q=1−p
n=number of trials
x=number of successes In this example, assuming a binomial distribution for session failures, the probability of 3 failures independently occurring in 10 sessions (as observed in sample 532) can be determined, where x=3, n=10, and p=0.08.

Hypothesis testing for the binomial distribution is then performed. In this example:

The null hypothesis is $H_0$: p≤0.08 (i.e., the IP is not problematic (better than average))

The alternative hypothesis $H_0$: p>0.08

Setting a probability threshold or significance level of α=0.05 (confidence interval of 95%), P(x≤2)=0.96, which is >0.95 (confidence interval calculated as 1−α)

Thus, the null hypothesis can be rejected with a 95% level of confidence. Alternatively the IP address is problematic (bad) with 96% certainty.

Suppose, for example, that when performing hypothesis testing for the binomial distribution, the sample of 10 sessions included 0 failures. In this case, P(x≤−1) is null, and the hypothesis testing would not work. Instead, the following can be calculated:

The probability that p≤0.08 is:

$$\frac{\int_0^{0.008} (1-p)^n dp}{\int_0^1 (1-p)^n dp} = 1 - (1 - 0.08)^{n+1} = 20\% \text{ (for } n = 10\text{)}$$

i.e., the IP address is determined to be good with 20% certainty.

FIG. 6A illustrates an example embodiment of sample results for a CMTS node.

In the example shown, for each CMTS (602), the failure rate (604) of the number of sessions (606) under the CMTS is shown. CMTSes can be identified using identifiers such as their corresponding IP addresses. Also shown for each CMTS node is a label (608) of "good" or "bad" for the node and a confidence level (610) for the labeling of the node. In this example, CMTSes 612-620 are identified or highlighted or marked as bad nodes, as the probability of the observed number of failures under the node significantly deviates from a baseline failure rate with a high level of confidence (e.g., exceeding 95%).

FIG. 6B illustrates an example embodiment of sample results for Service Group nodes in a CMTS node. In this example, information associated with service groups under CMTS 614 is shown. In this example, fail rate, session count, label, and confidence of the label for each service group node are shown. As shown, service group nodes 632 and 634 have been marked as bad nodes since the probability of the observed number of failures significantly deviates from a baseline probability with a confidence of 99% (e.g., greater than 95%).

Figure 6C:
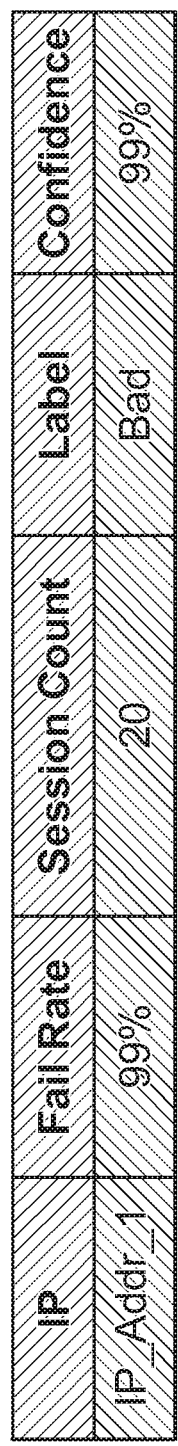
FIG. 6C illustrates an example embodiment of a sample result for an IP address in a service group node.

FIG. 6C illustrates an example embodiment of a sample result for an IP address in a service group node. Shown in this example is an IP address (e.g., IPv4 or IPv6 address) under service group node 632. In this example, fail rate, session count, label, and confidence of the label for the IP address are shown. As shown, the IP address has been marked or flagged as a bad node, since the probability of the failures observed for sessions under the IP address exceeds a baseline probability/failure rate for the IP address by a threshold with a high confidence level of 99% (e.g., greater than 95%).

As shown in the examples of FIGS. 6A-6C, using the statistical analysis described above, various nodes in a network topology can be identified as bad nodes with a certain level of confidence.

Thus, candidate problematic nodes in a network topology can be identified by first determining sessions that have failed and identifying the path of network nodes in an ISP's network associated with the sessions. Each of the nodes in the paths are then further evaluated to determine whether the probability of the number of failures observed under a given nodes deviates significantly from a baseline. If so, then the node is identified as bad nodes.

Selecting Bad Nodes from Candidates

Figure 7A:
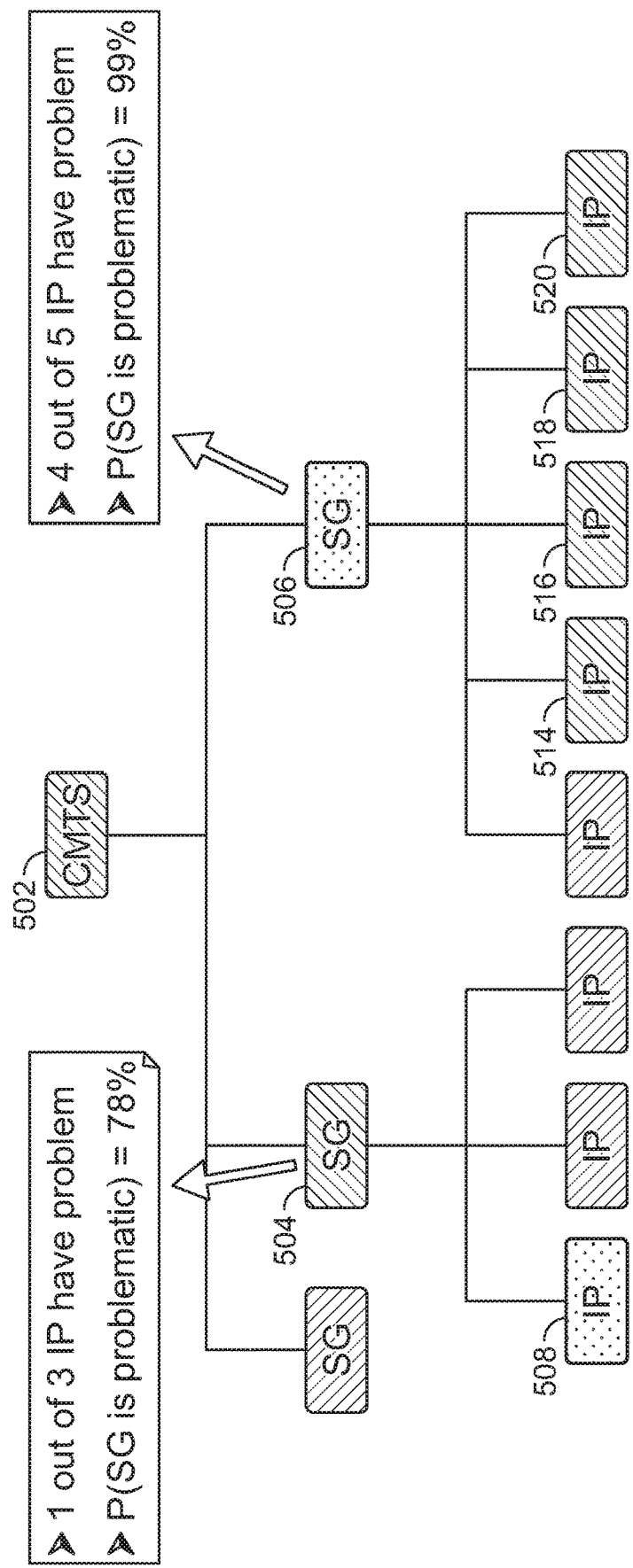
FIG. 7A illustrates an example embodiment of a network structure.

FIG. 7A illustrates an example embodiment of a network structure. In this example, CMTS 502, service groups 504 and 506, and IP addresses 514-520 were identified as candidate problematic nodes (e.g., because sessions under IP addresses 514-520 were determined to have failed on joined/nonjoined, buffering ratio, bitrate, etc., and nodes 502-506 are also candidate problematic nodes because they are in the distribution path for those IP addresses that experienced session failures).

In this example, 1 out of 3 IP addresses (i.e., IP address 508) under service group 704 were found to be problematic. The probability of service group 504 being problematic is 78% (e.g., based on statistical modeling of failure rate with respect to one or more metrics at the service group level). Because 78% does not exceed a threshold confidence of 95%, service group 504 is not marked as "bad" or problematic. Similarly, candidate problematic nodes 502 and 514-520 were not selected as "bad" or problematic.

However, 4 out of 5 IP addresses (i.e., IP addresses 514-520) under Service group 506 were found to have problems (session failures). The probability of service group 506 being problematic is 99%, which exceeds the confidence level of 95%. Service group 506 is therefore marked as "bad" or problematic. In this example, IP address 508 is also selected as a "bad" node.

Figure 7B:
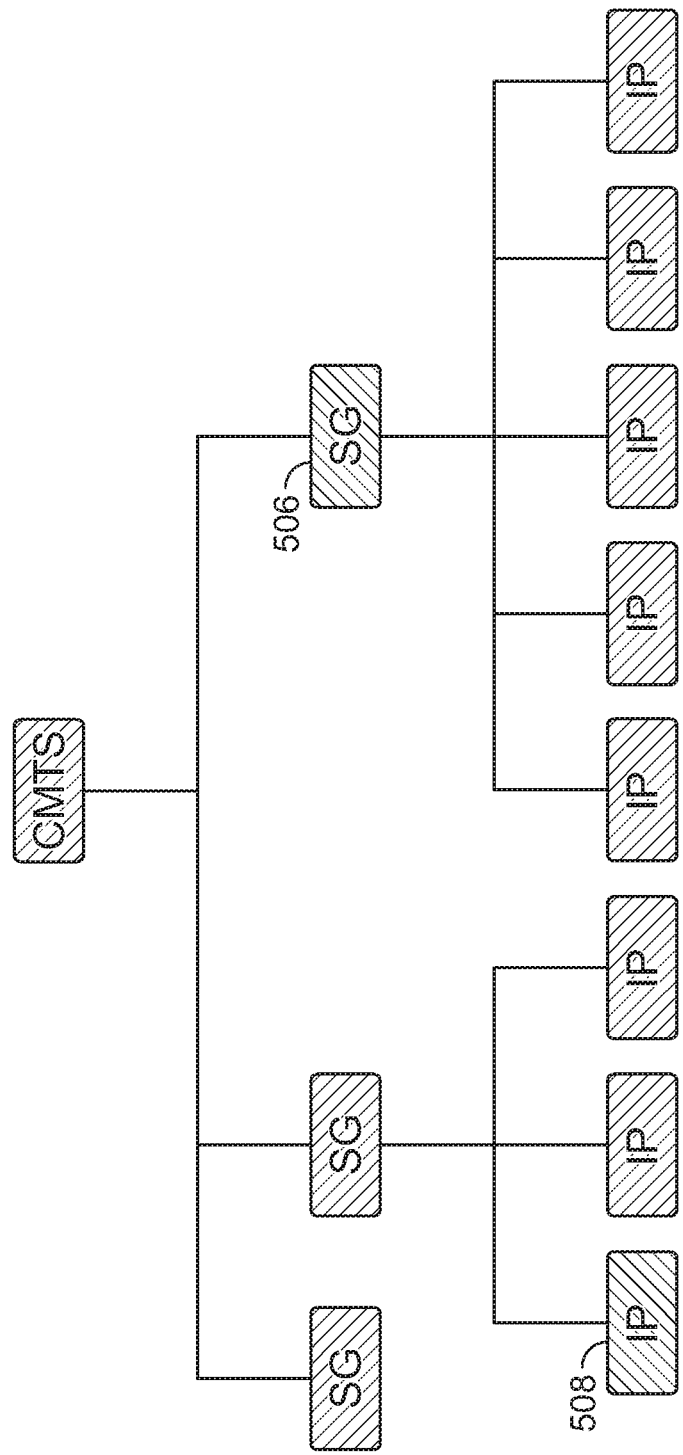
FIG. 7B illustrates an example embodiment of results of selection of bad nodes from candidates.

FIG. 7B illustrates an example embodiment of results of selection of bad nodes from candidates. For example, continuing from the example of FIG. 7A, nodes 506 and 508 have been identified as bad nodes based on the processing described above.

While bad or problematic nodes within a network topology have been identified, it is possible that other factors outside of the network may have caused, or be the source of, the detected problems. In various embodiments, other factors include other nodes in the content delivery process, such as publishers, CDNs, and devices.

Considering Other Factors

Figure 8A:
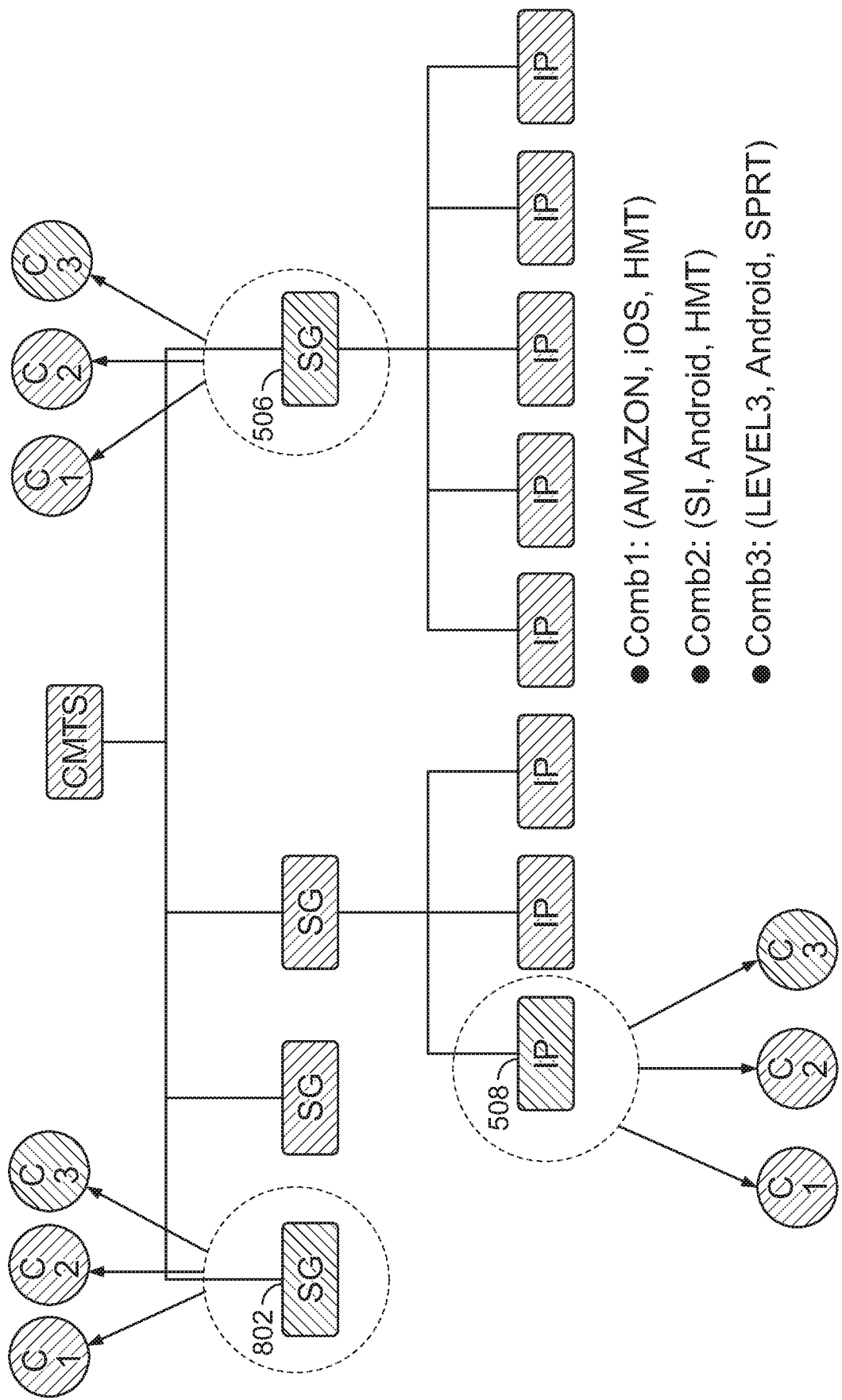
FIG. 8A illustrates an example embodiment of considering other factors outside of a network topology.

FIG. 8A illustrates an example embodiment of considering other factors outside of a network topology. In this example shown, suppose that in addition to service group 506 and IP address, 508, another service group node 802 is also selected as a bad node. In the example of FIG. 8A, CDN, device, and publisher diversity are also considered for problematic nodes. In various embodiments, other types of factors can also be considered.

In the example shown, three combinations of parameters including CDN, device, and publisher are evaluated or considered:

Combination 1—CDN: Amazon; Device: iOS; Publisher: "Home Movie Theater (HMT)"

Combination 2—CDN: SI; Device: Android; Publisher: "Home Movie Theater (HMT)"

Combination 3—CDN: Level3; Device: Android; Publisher: "Sports Network (SPRT)"

In this example, the combinations that are chosen are combinations that are observed to be common across the sessions in the three "bad" nodes. In the example shown, of the three combinations observed in the three "bad" nodes, it is determined that sessions with the characteristics of combination 3 are problematic in all three "bad" network nodes 506, 508, and 802.

Figure 8B:
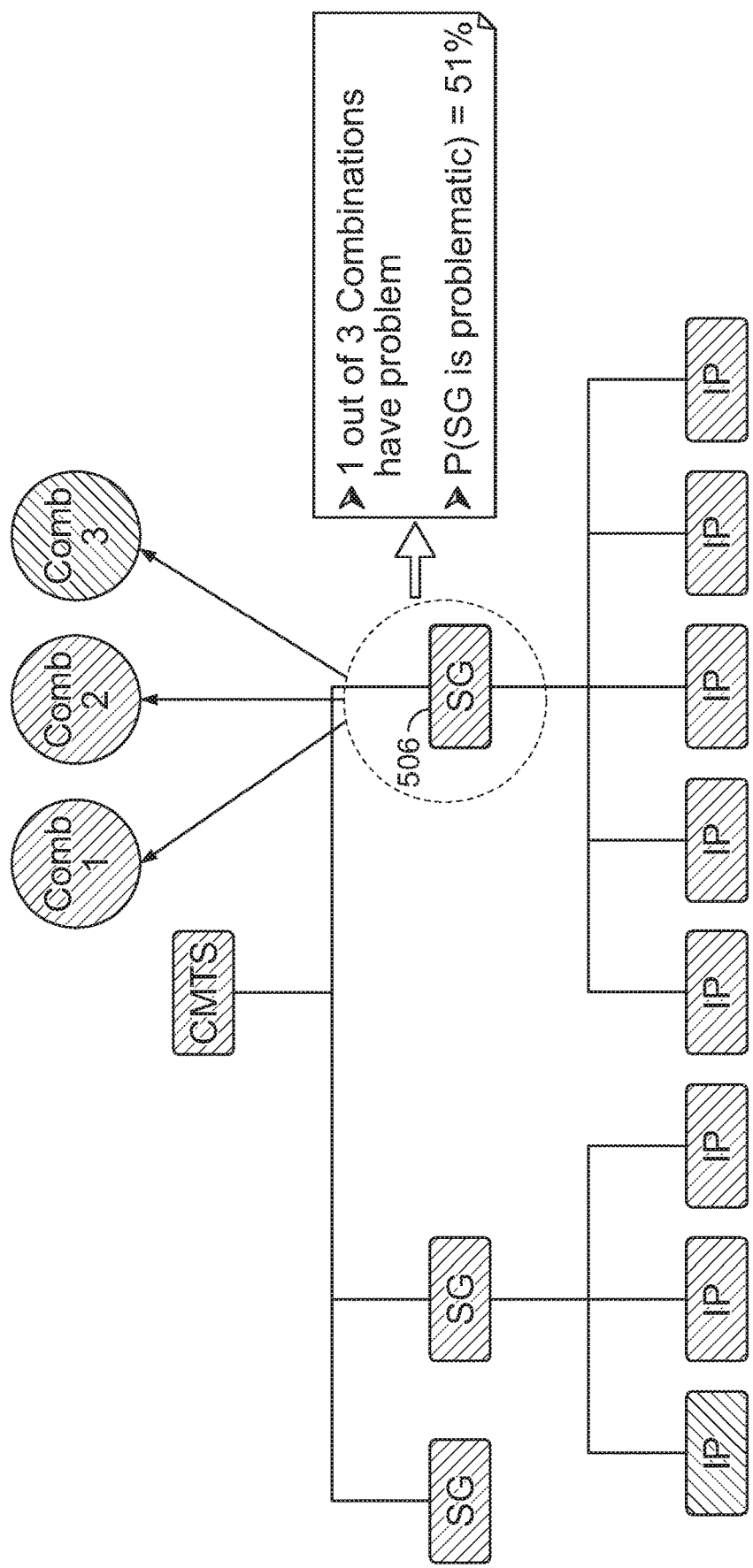
FIG. 8B illustrates an example embodiment of considering CDN, device, and publisher combinations for a "bad" node.

FIG. 8B illustrates an example embodiment of considering CDN, device, and publisher combinations for a "bad" node. In this example, it is determined that the 1 out of 3 combinations have problems for service group node 506. The probability of the service group being problematic is determined to be 51% (e.g., using the statistical modeling of QoE metrics at the granularity of the service group level using the processing described above).

Finding Frequent Patterns

FIG. 8C illustrates an example embodiment of determining a frequent pattern.

In the example shown, information about sessions for various combinations of CDN, device, and publisher are shown. As shown, for each combination, the number of joined sessions is shown. Also shown is the total number of sessions associated with a given combination of parameters (CDN, device, publisher). A failure rate for the sessions associated with the given combination is also shown. For example, aggregate session data is determined for each combination if parameters shown. In this example, failure rate is determined according to the metric of whether a session was joined or non-joined (i.e., a session is defined to have failed if it did not join). Here, the failure rate is determined as;

$$\text{fail rate} = \frac{\text{total sessions} - \text{joined sessions}}{\text{total sessions}}$$

A confidence that a given combination of parameters/factors is "bad" also determined (e.g., using hypothesis testing, as described above, where a baseline failure rate according to a metric such as joined/non-joined can be determined for a particular combination of parameters by fitting a statistical model, as described above, to session experience data associated with the particular combinations of parameters). As one example, combinations with confidence more than 95% are considered "bad" combinations. The combinations that are determined to be "bad" are shown at 822.

In some embodiments, the combination of any number of parameters can be evaluated (e.g., not only combinations of all 3 parameters in this example, but combinations of two of the parameters, or a parameter individually).

Labeling Nodes with Root Causes

FIG. 9 illustrates an example embodiment of labeling nodes with root causes.

In some embodiment, the information shown in the example of FIG. 9 is provided as a report generated by output engine 322.

In this example, sessions in a particular service group are shown. The sessions are associated with parameters such as CDN, Device, and Publisher. The sessions are also associated with the metric "Joining" (indicating whether the video played), the value of which can either be "nonjoined" (indicating that the video did not play) or "joined (indicating that the video played). If the session is nonjoined, then it has failed (i.e., in this example, session failure/success is defined by join failure/success). In this example, using the process described above, the root cause for why a session in the service group failed can be determined. As described above, the root cause can be due to some combination of parameters such as CDN, Device, and Publisher. The root cause can be due to the combination of any number of such parameters (e.g., due to just one parameter, due to a combination of two parameters, or the combination of all three parameters shown). If factors external to the network are eliminated, then the fault is isolated to the service group node itself Additional Details Regarding Joining on IP address.

As described above, end user experience data can be joined to network topology information using IP addresses that are common to both sets of data. In some cases, a single end point (e.g., client device) may be associated with multiple IP addresses, such as both IPv6 and IPv4 addresses. The end point may use either or both protocols to communicate. Platform 302 may then observe session summaries and/or IP address-to-network topology mappings that are associated with different IP addresses, but may in fact correspond to the same end point device. Platform 302 can be configured to infer that different IP addresses are correlated with each other.

As one example, an ISP can provide to platform 302 a mapping of IPv6 to IPv4 addresses (which the ISP has assigned to end points). If platform 302 observes a session with an IPv4 address, platform 302 can also associate the session with a corresponding IPv6 address, or vice versa, based on the mapping. As another example, if platform 302 observes sessions associated with IPv6 and IPv4 addresses, platform 302 can use a network topology to determine that the addresses are associated with the same service group, and that the sessions with different IP addresses belong to the same service group (e.g., correlating IP addresses by service group or other component).

In some cases, network providers may also provide dynamic IP addresses (versus static IPs), where the IP address assigned to a device or end point by the network may be temporary, and change over time. Thus, over time, sessions from the same end point may be associated with different IP addresses as new IP addresses are assigned to the end point over time by the network provider.

In some embodiments, platform 302 also obtains (e.g., from the network provider) a mapping of updated IP addresses indicating the new IP address for an end point, the previous IP address for the end point, as well as information about when the new IP address was dynamically assigned. For example, the ISP can provide to platform 302 such a mapping of old to new IP addresses whenever it dynamically updates IP addresses (e.g., on a periodic or time driven basis, such as every two to three weeks).

As one example, suppose that platform 302 has observed three sessions. The first two sessions are associated with IP_address_1, while the third session is associated with IP_address_2. The network provider provides to platform 302 a mapping indicating that IP_address_1 was dynamically updated to IP_address_2 when performing dynamic IP address assignment. Thus, IP_address_1 and IP_address_2 are associated with the same end point. When performing analysis of sessions and correlation to network topology, platform 302 can determine that the metrics for those sessions are associated with the same device and belong to the same network components in a network topology (e.g., same home, same service group, CMTS, etc.).

In some embodiments, platform 302 can determine whether a device is associated with multiple IP addresses by using a unique device identifier. As one example, when a content player (or monitoring) application or software is installed on a client end point, the client device can be assigned a unique device identifier assigned by platform 302. In addition to an associated IP address, a session summary can also be associated with the unique identifier assigned to the device by platform 302. Thus, the history of IP address changes for an end point can be maintained, and information about different sessions across time can be correlated together.

Additional Example Network Topologies

The following are additional examples of network topologies for other types of service providers.

Example DSL (Digital Subscriber Line) Network Topology

Figure 10A:
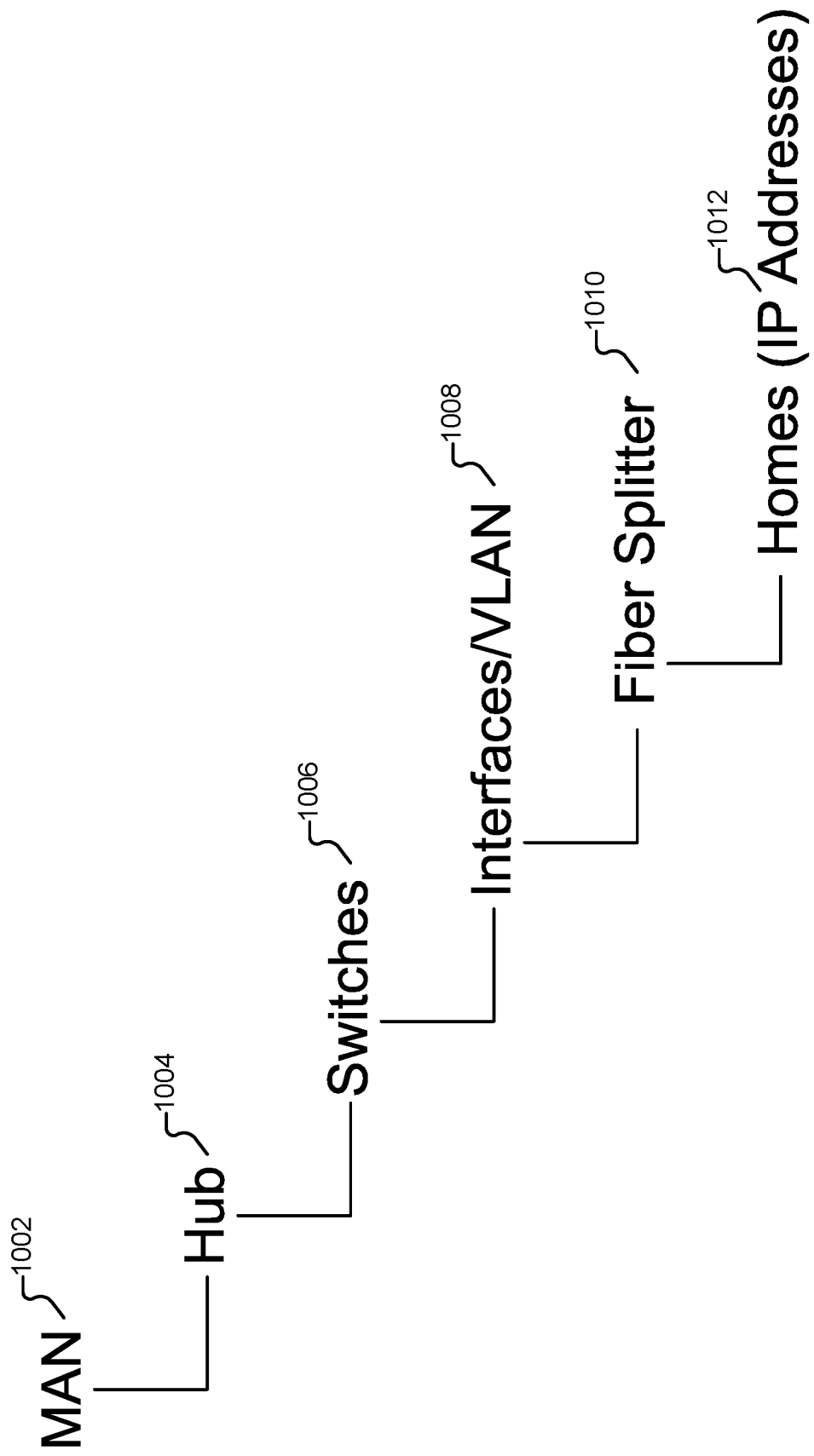
FIG. 10A illustrates an embodiment of a network topology.

FIG. 10A illustrates an embodiment of a network topology. In this example, an embodiment of a network topology or hierarchy or organizational network structure for a DSL network provider is shown.

In the example shown, the DSL network includes a number of Metropolitan Area Networks (MANs) (1002). At the next level of the topology, each MAN has a number of hubs (1004). Each hub has a number of switches 1006. Each switch further has a number of interfaces/VLANs (Virtual Local Area Networks) 1008. Each interface/VLAN has a number of fiber splitters 1010, which each include a number of homes (IP addresses) 1012.

Example Cellular Network Topology

Figure 10B:
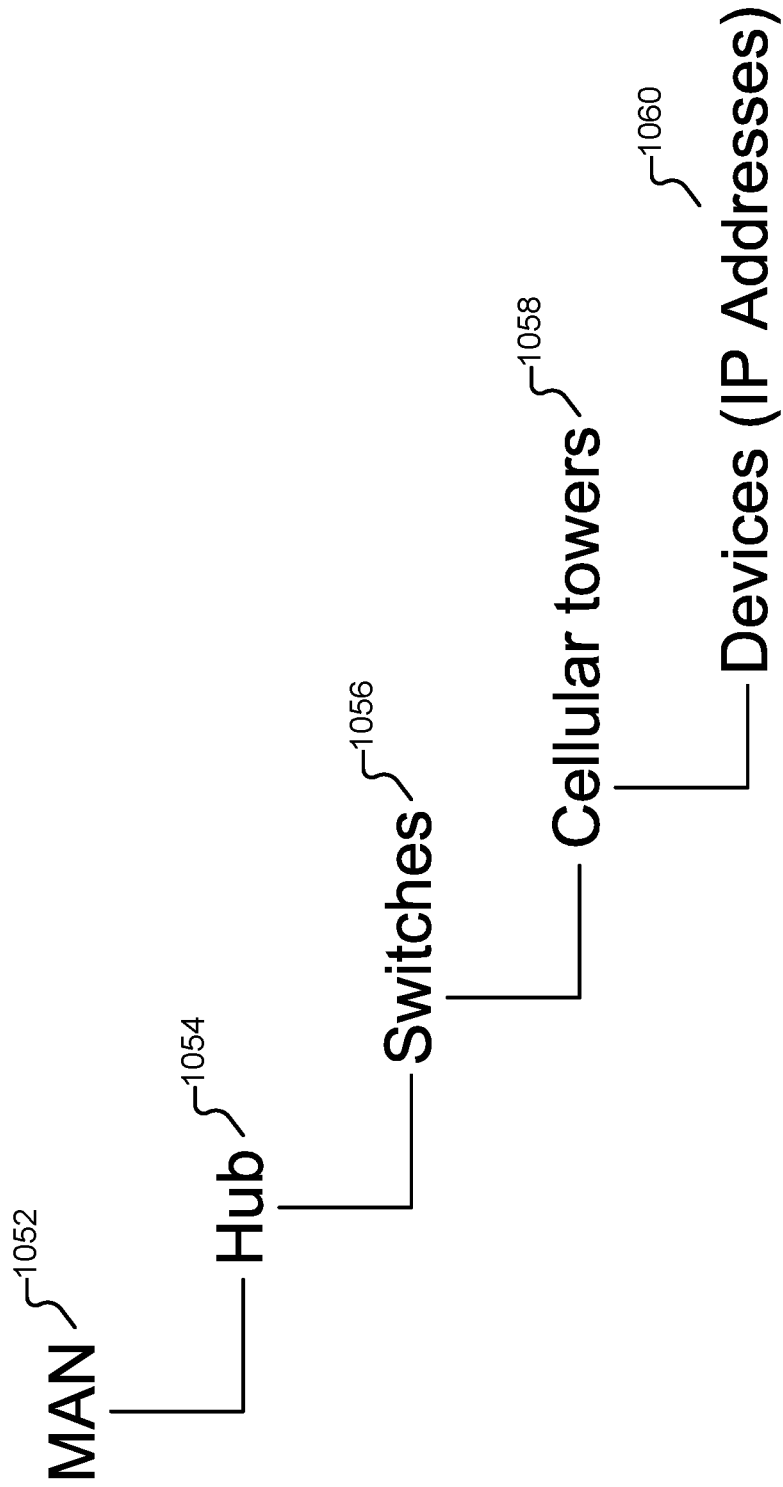
FIG. 10B illustrates an embodiment of a network topology.

FIG. 10B illustrates an embodiment of a network topology. In this example, an embodiment of a network topology or hierarchy or organizational network structure for a cellular network provider is shown.

In the example shown, the cellular network includes a number of Metropolitan Area Networks (MANs) (1052). At the next level of the topology, each MAN has a number of hubs (1054). Each hub has a number of switches 1056. Each switch further has a number of cellular towers 1058, which correspond to ports on the switches. Each cellular tower has a number of devices (IP addresses) 1060.

Example Interfaces

Example Use Case 1

FIGS. 11A-14B illustrate example embodiment of interfaces used to provide network insights in a first example use case. In some embodiments, the example interfaces of FIGS. 11A-14B are provided by output engine 322.

Figure 11A:
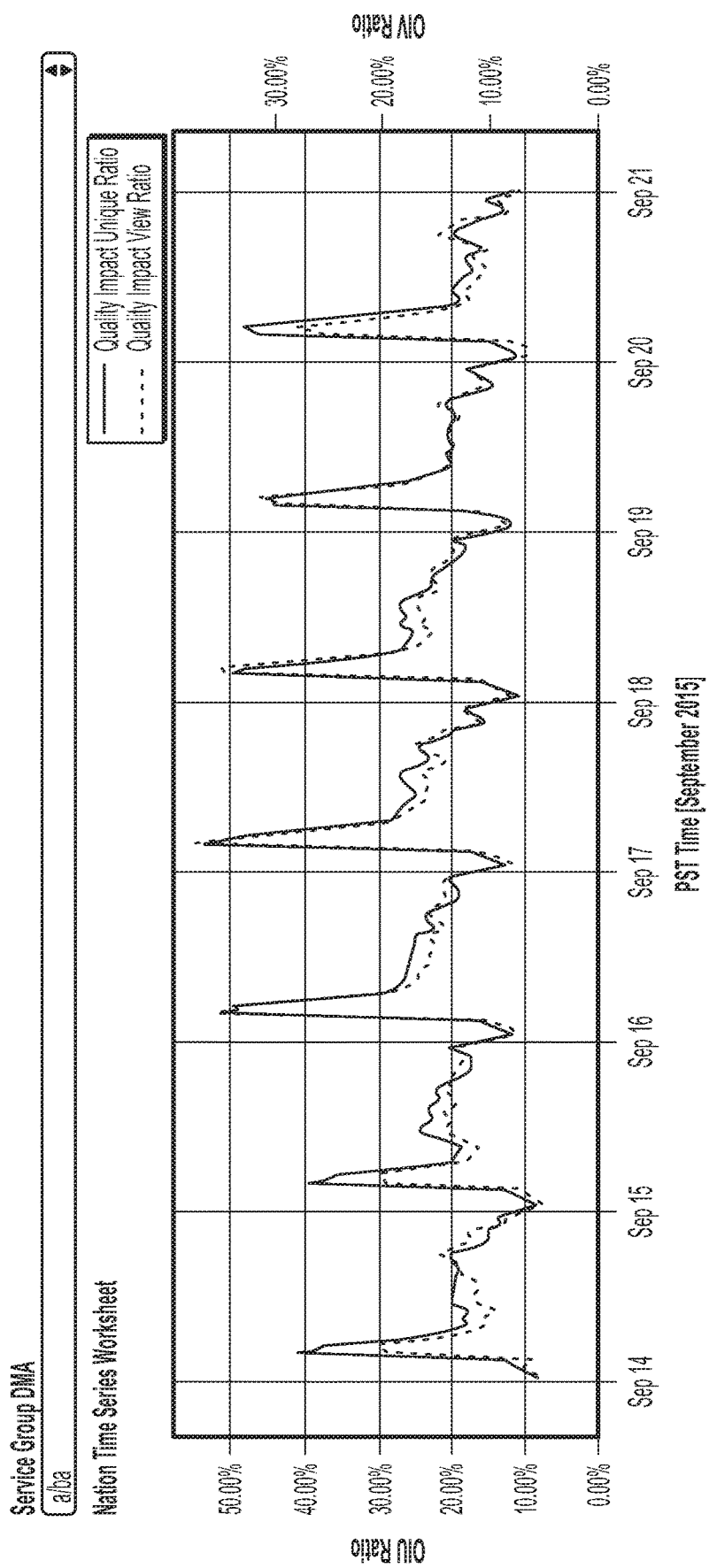
FIG. 11A illustrates an example embodiment of an interface for viewing end user experience by CMTS.
Figure 11A:
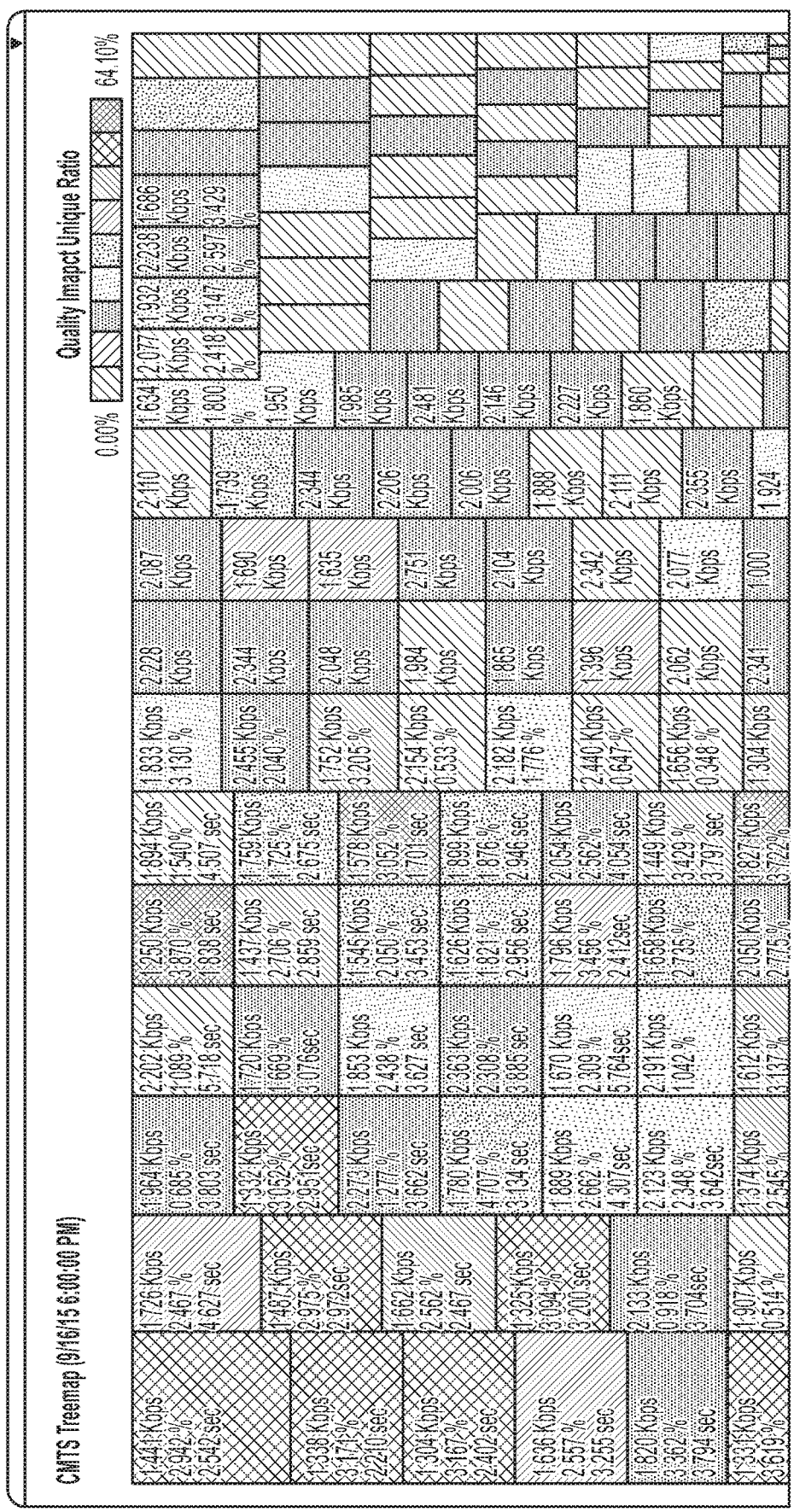
Figure 11B:
FIG. 11B illustrates an example embodiment of an interface for viewing end user experience by Service Group.

FIGS. 11A and 11B illustrate example embodiments of interfaces for head-end engineering and capacity planning.

FIG. 11A illustrates an example embodiment of an interface for viewing end user experience by CMTS. In this example the most impact CMTS(es) are indicated.

FIG. 11B illustrates an example embodiment of an interface for viewing end user experience by Service Group. In some embodiments, the example interface of FIG. 11B is a drill down of a service group from the CMTS view provided in FIG. 11A. In this example, the most impacted service group(s) are shown.

Figure 12A:
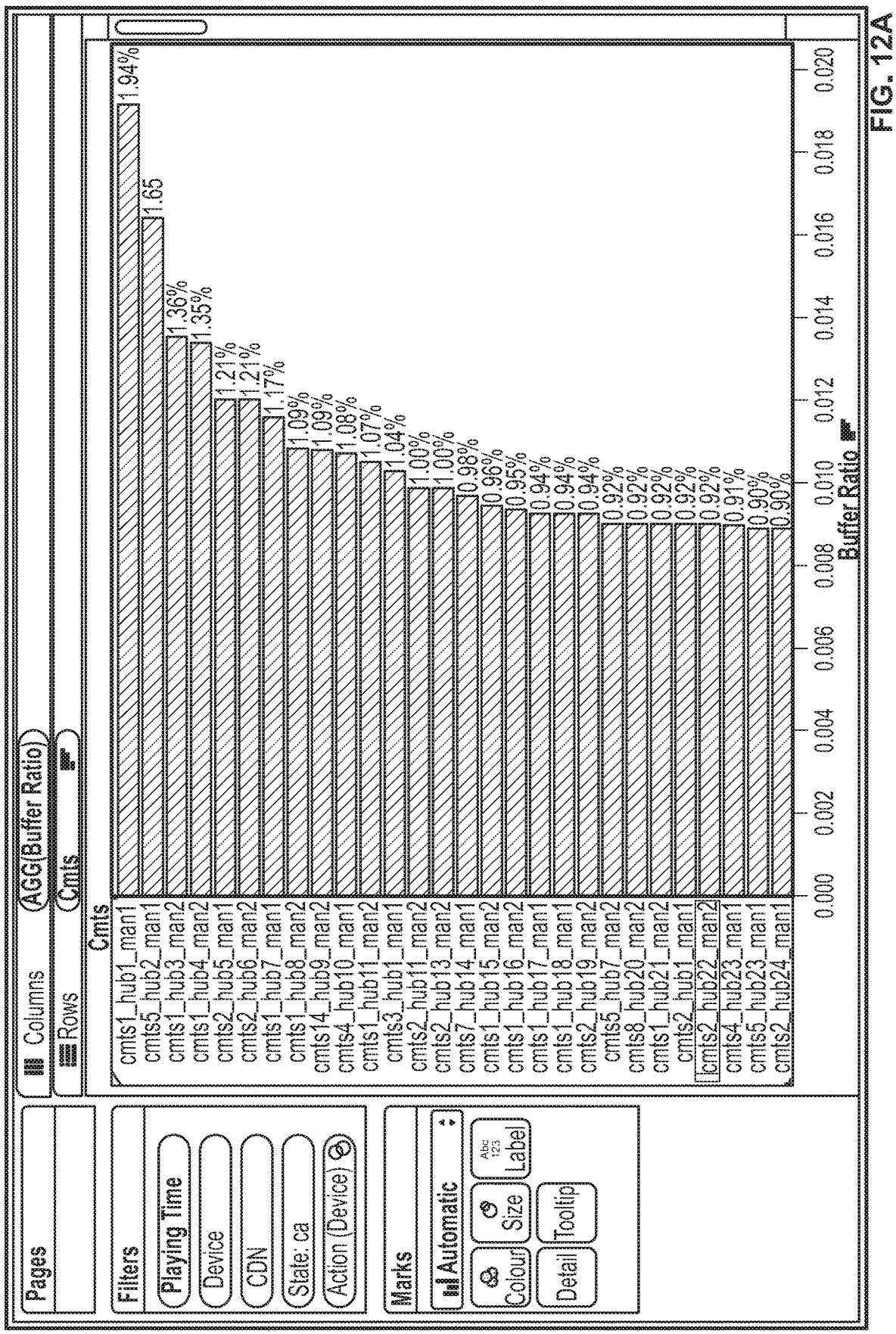
FIG. 12A illustrates an example embodiment of an interface for viewing CMTS fault isolation classification.

FIG. 12A illustrates an example embodiment of an interface for viewing CMTS fault isolation classification. In the example shown, CMTS nodes are rank ordered by experience, providing prioritization guidance.

Figure 12B:
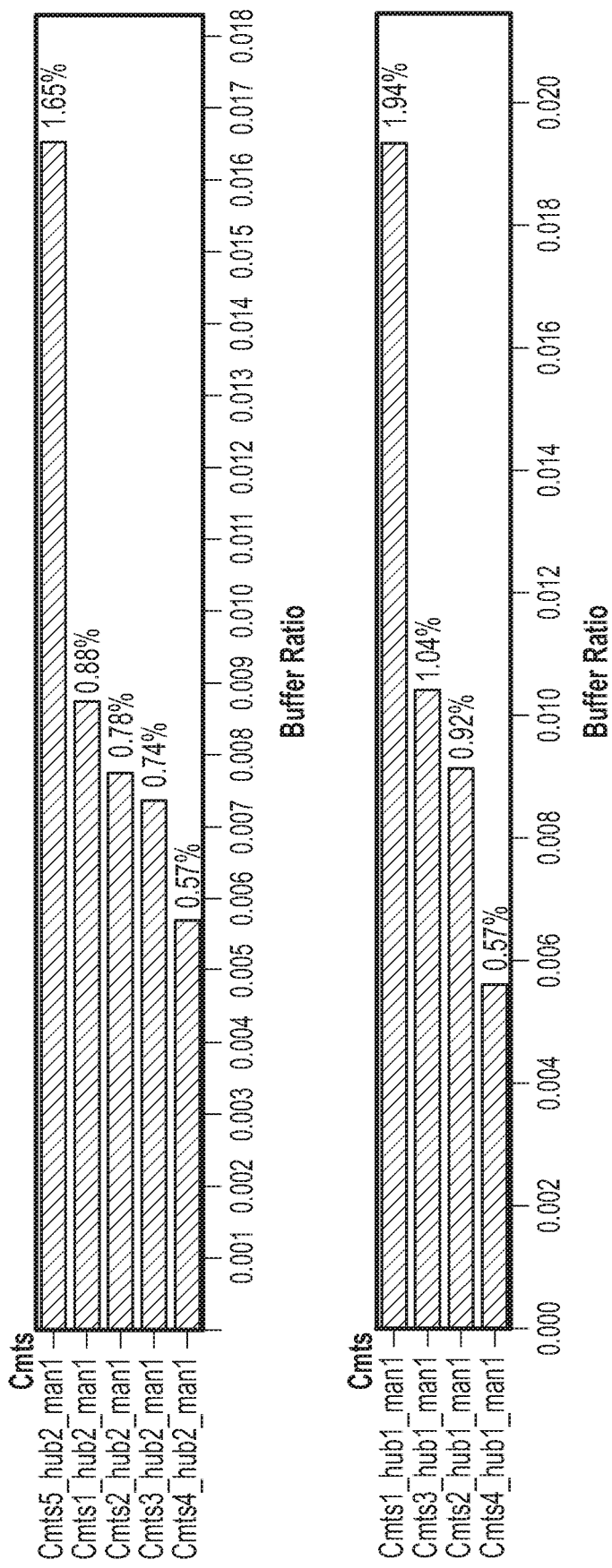
FIG. 12B illustrates an example embodiment of an interface for viewing CMTS fault isolation drilldown.

FIG. 12B illustrates an example embodiment of an interface for viewing CMTS fault isolation drilldown. In the example shown, comparison of problematic CMTS nodes with nearby nodes indicates a need for capacity expansion.

Figure 12C:
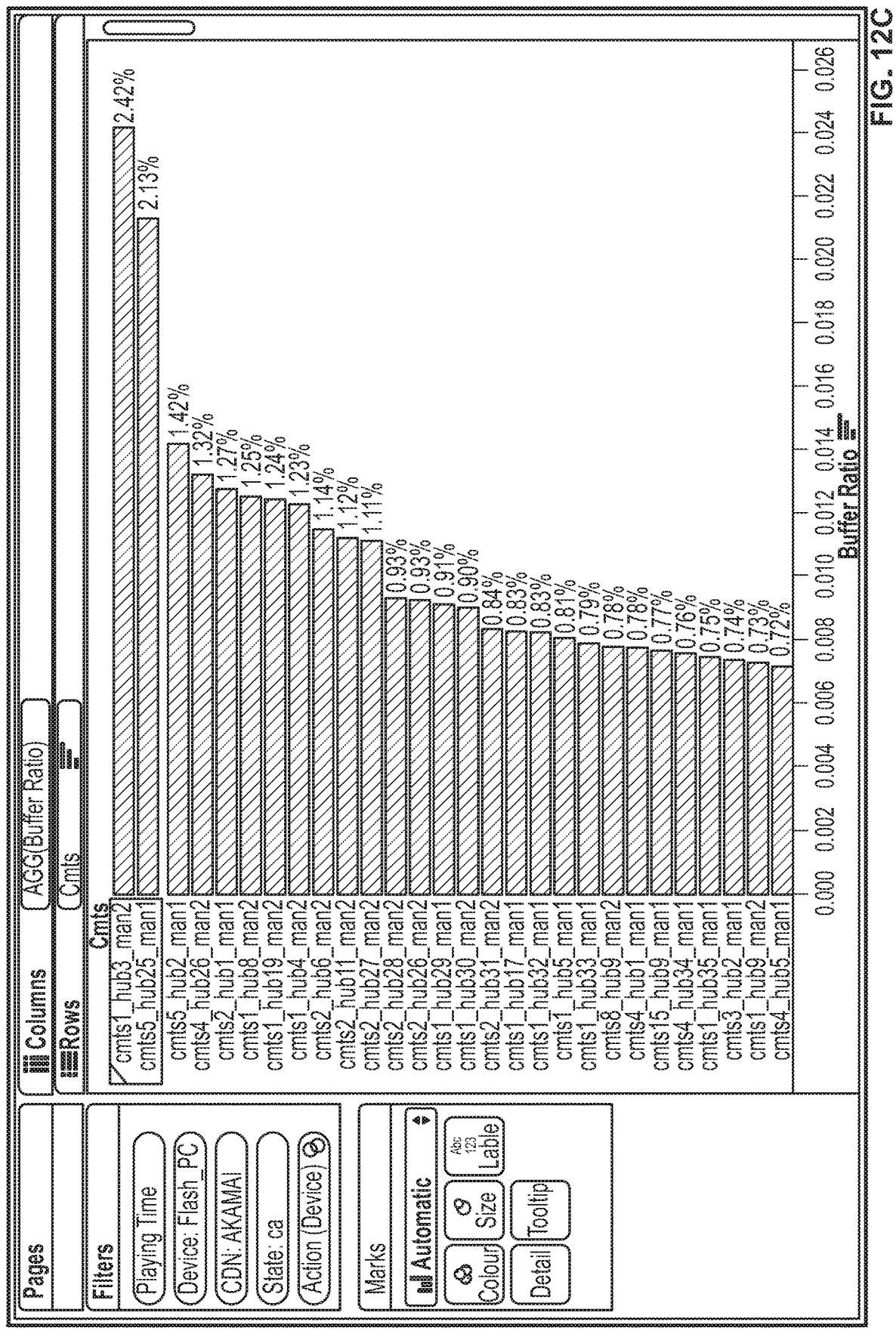
FIG. 12C illustrates an example embodiment of an interface for viewing CMTS fault isolation classification.

FIG. 12C illustrates an example embodiment of an interface for viewing CMTS fault isolation classification. In the example shown, CMTS performance is filtered by device type and CDN.

Figure 12D:
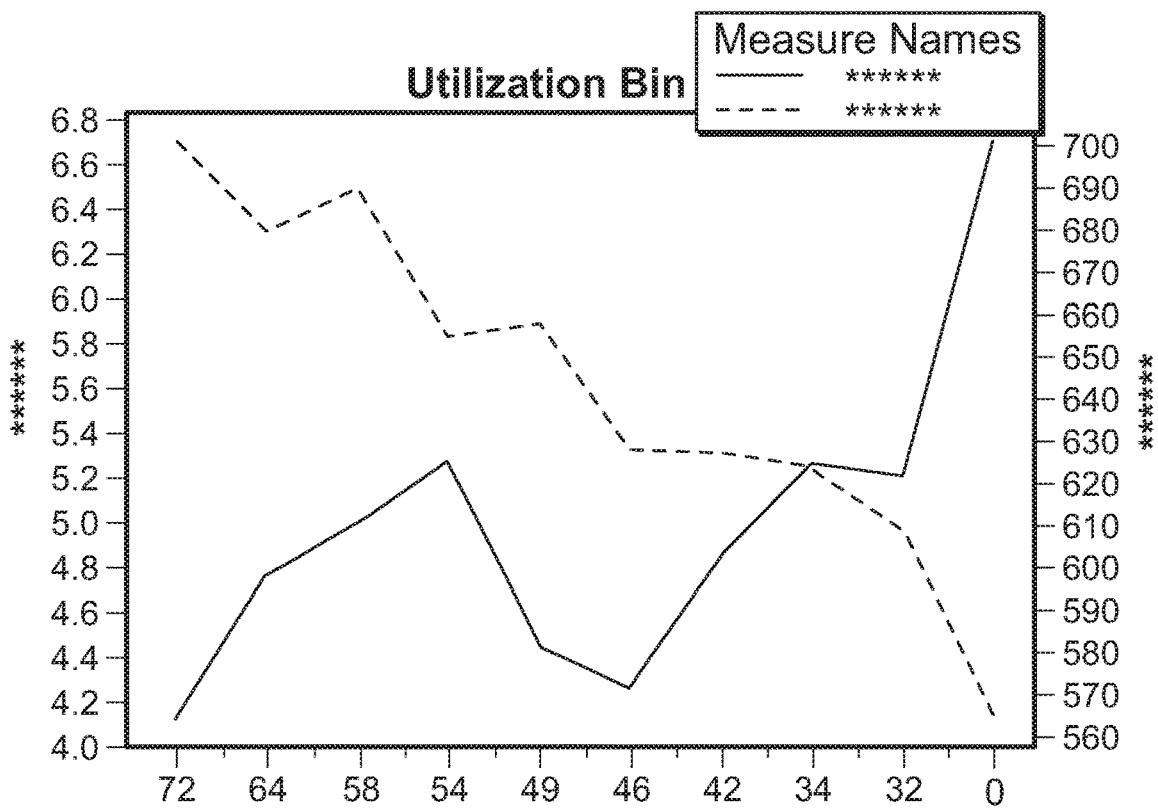
FIG. 12D illustrates an example embodiment of an interface for viewing experience and utilization correlation.

FIG. 12D illustrates an example embodiment of an interface for viewing experience and utilization correlation. The graph shown in this example shows the worst 5 percent of buffering and bitrate by service group utilization for Illinois service groups.

Figure 12E:
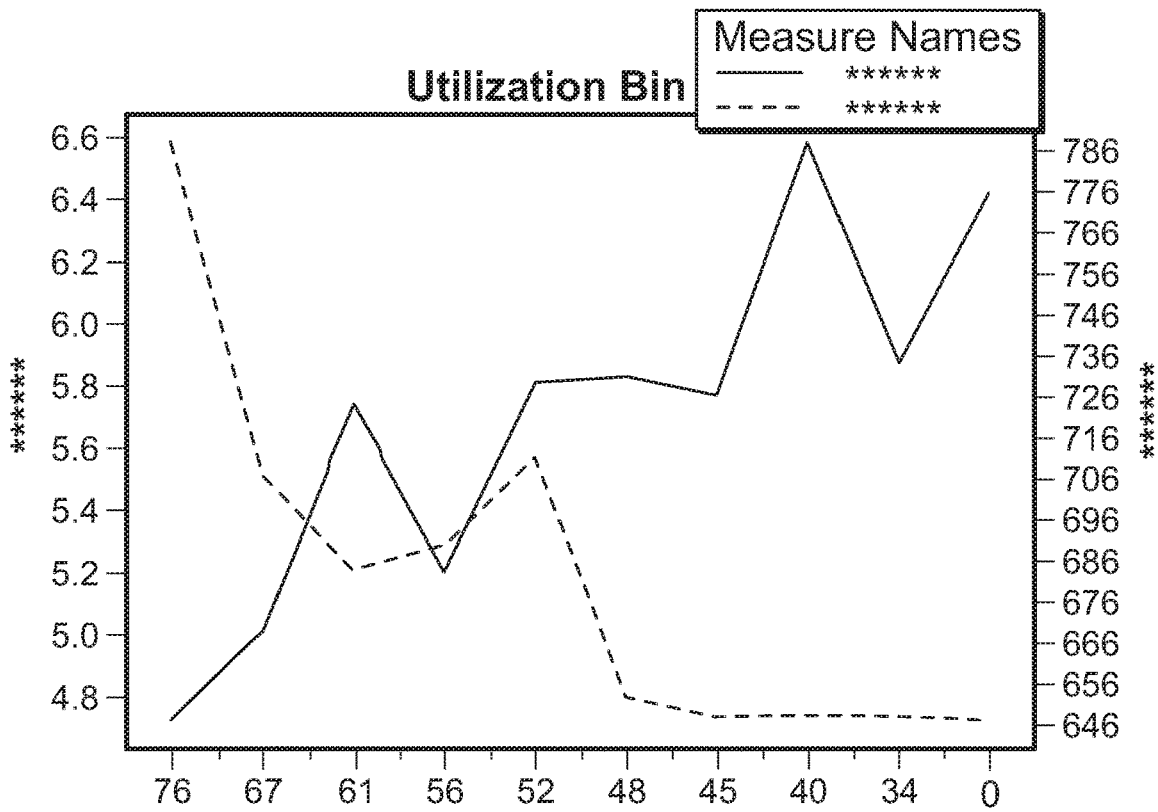
FIG. 12E illustrates an example embodiment of an interface for viewing experience and utilization correlation.

FIG. 12E illustrates an example embodiment of an interface for viewing experience and utilization correlation. The graph shown in this example shows the worst 5 percent of buffering and bitrate by service group utilization for California service groups.

Figure 13:
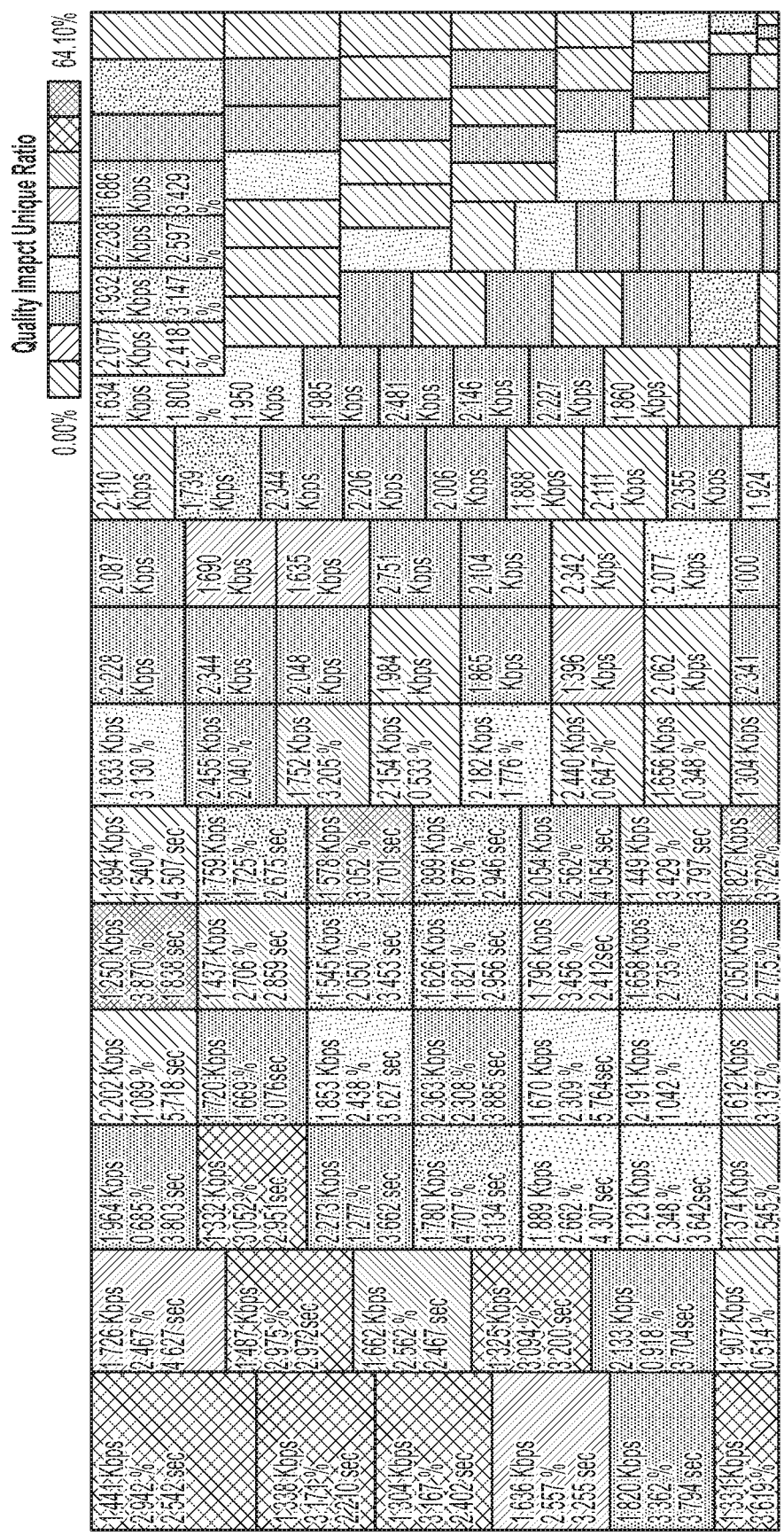
FIG. 13 illustrates an example embodiment of an interface for viewing overall experience at a service group level.

FIG. 13 illustrates an example embodiment of an interface for viewing overall experience at a service group level. There may be several reasons as to why video performance may be poor at a service group level, such as high utilization, plant-specific issues, such as fiber cuts, or high noise to signal ratio for some fiber nodes or fiber cables, etc. In the example shown, the majority of service groups are performing well. The data provided in this example allows for identification of service groups with poorer internet video performance. In this example, the performance of a service group is indicated by a quality impact ratio (e.g., indicating the impact of a service group on end user experience quality). In some embodiments, platform 302 is configured to supply data at a granularity of five minutes (or any other appropriate time window) to map against service group utilization.

Figure 14A:
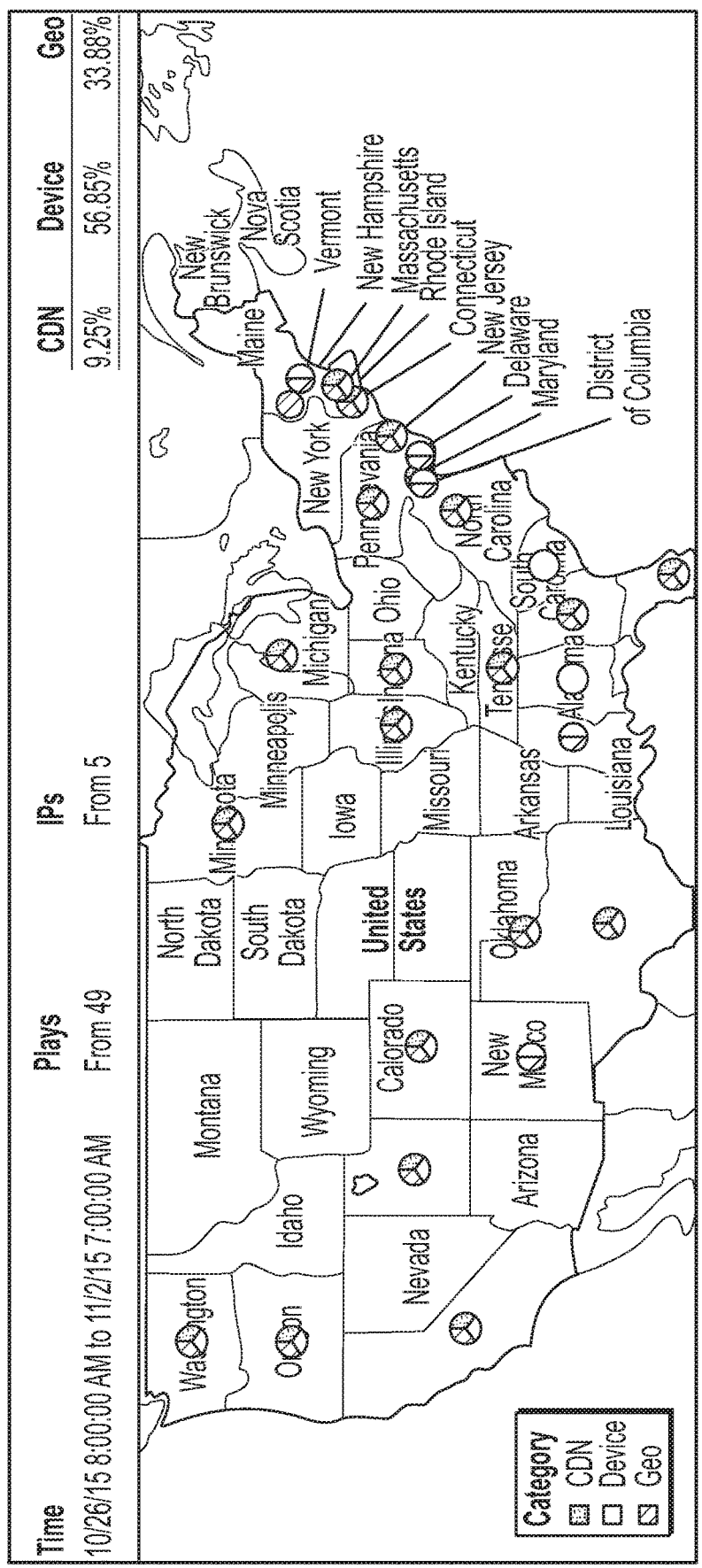
FIG. 14A illustrates an example embodiment of a network insights dashboard.

FIG. 14A illustrates an example embodiment of a network insights dashboard. In the example shown, each pie chart in one of the geo locations (e.g., states or major cities) shows the high level breakdown of issues (e.g., percentages of issues caused by service groups, or CDN peering points, or in home networks, etc.).

Figure 14B:
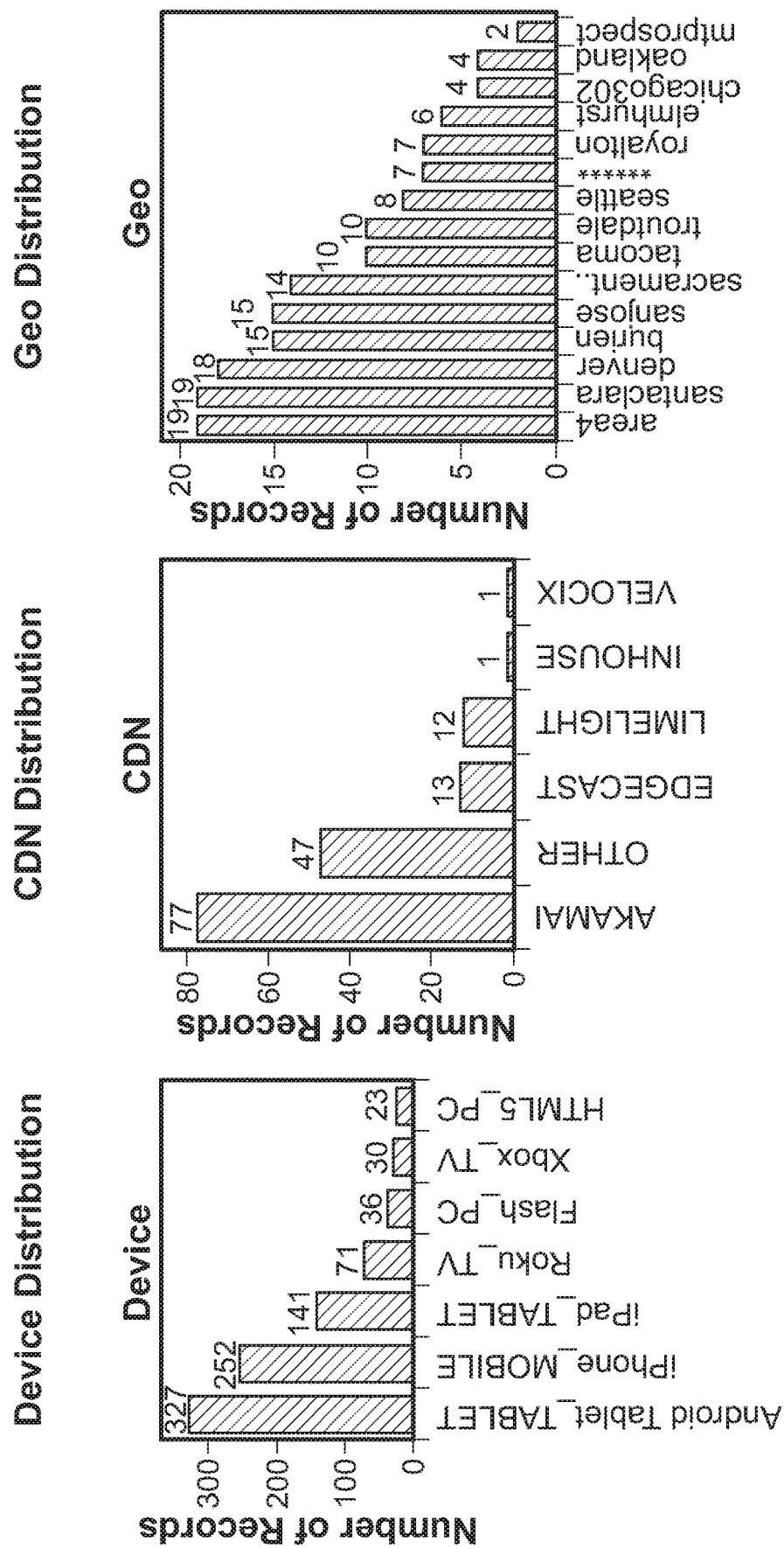
FIG. 14B illustrates an example embodiment of a network insights dashboard.

FIG. 14B illustrates an example embodiment of a network insights dashboard. In this example, distributions of records (where each record can be of an individual video session, or an IP address) among devices, CDNs, and geolocations are shown.

Example Use Case 2

FIGS. 15A-18 illustrate example embodiment of interfaces used to provide network insights in a first example use case. In some embodiments, the example interfaces of FIGS. 15A-18 are provided by output engine 322.

Figure 15A:
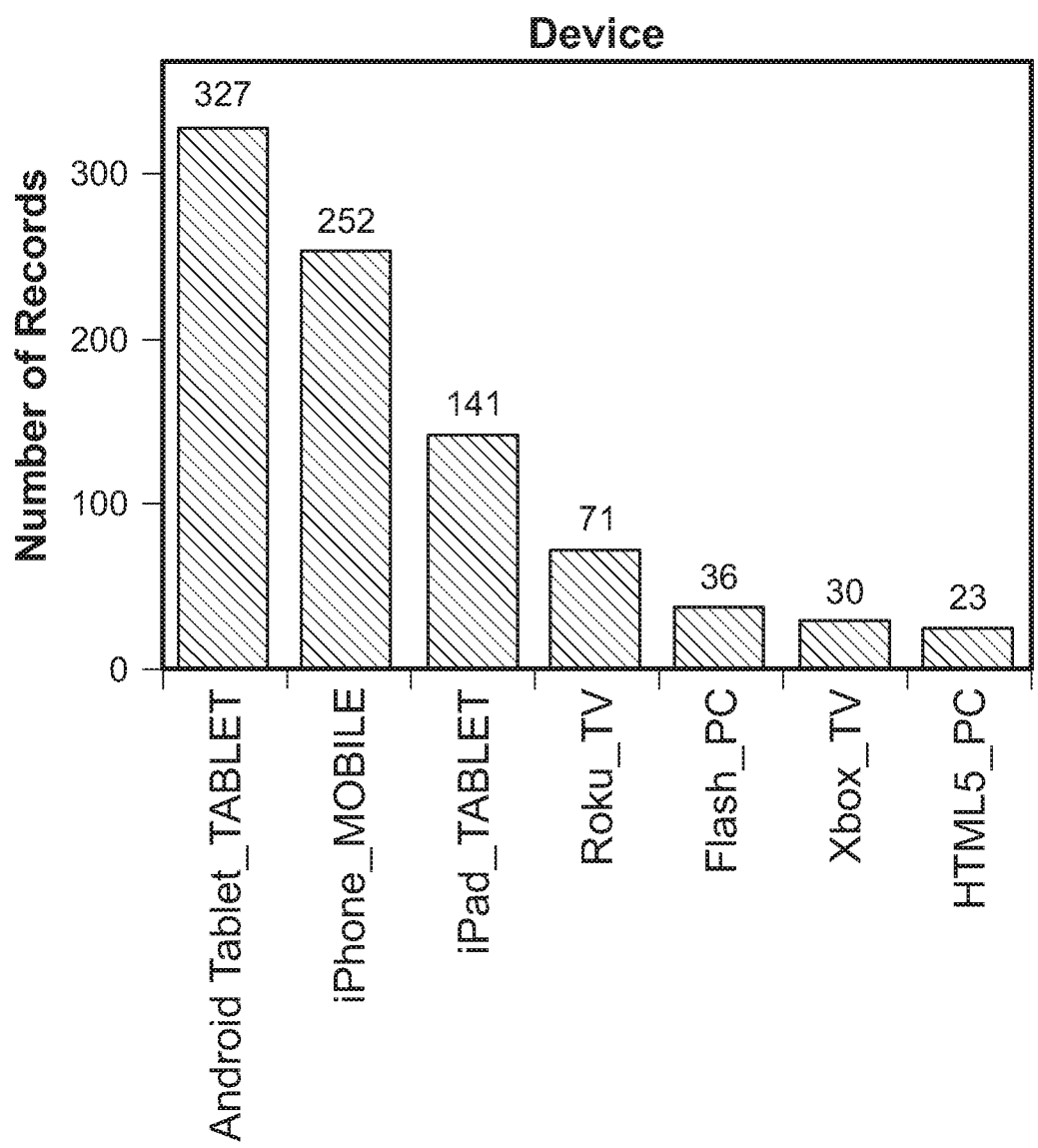
FIG. 15A illustrates an example embodiment of a distribution of faults by different device types.

FIG. 15A-15B illustrate example embodiments of interfaces for viewing device type fault isolation. In some embodiments, the fault isolation shown in this example is performed by fault isolation engine 318 of platform 302.

FIG. 15A illustrates an example embodiment of a distribution of faults by different device types. In this example, a distribution of records over a window of time (e.g., from a start date to an end date) are shown. In this example, there are 327 instances of Android Tablets with faults. 252 instances of iPhone correlation with faults, and 141 instances of iPads with faults.

FIG. 15B illustrates an example embodiment of a device instance correlation. In this example, an instance of iPad correlation is shown. Information associated with a record involving the iPad device type is also shown. In some embodiments, the instance of iPad correlation shown is associated with the bar shown in the graph of FIG. 15A corresponding to iPad_TABLET.

FIG. 16 illustrates an example embodiment of an interface for viewing device type fault isolation. In this example, instances of iPad correlation on two other publishers is shown at 1602 and 1604.

FIG. 17 illustrates an example embodiment of an interface for viewing device type fault isolation. In this example, a service group drill down is shown. In particular, a drill down on 1602 (California, Oct. 31, 2015 4:00, Publisher C, Amazon, iPad) is shown. The drill-down into service group provides deeper visibility into iPad performance, such as buffering ratios, as shown at 1702.

FIG. 18 illustrates an example embodiment of an interface for viewing device type fault isolation. In this example, IP address (e.g., IPv4 of IPv6 address) drill down is shown. In this example, in order to rule out home network issues, a further drill down is performed to determine that other devices in the same home (with the same IP address) did not have buffering. This strongly indicates an issue with the iPad tablet device.

Example Use Case 3

FIGS. 19-20B illustrate example embodiment of interfaces used to provide network insights in a first example use case. In some embodiments, the example interfaces of FIGS. 19-20B are provided by output engine 322.

FIG. 19 illustrates an example embodiment of an interface for CDN fault isolation. In some embodiments, the fault isolation shown in this example is performed by fault isolation engine 318 of platform 302. In the example shown, analysis setup is performed. For example, the experiment attribute is set as CDN (i.e., an experiment is being run to deduce whether a particular CDN is at fault). This attribute will be allowed to vary when identifying sessions for evaluation. The fixed attributes include Geo (e.g., state), Time (e.g., hour), device, and publisher. The values for these attributes will be fixed when identifying sessions for evaluation. Thus, sessions which vary only on the experiment attribute of CDN and share values for the fixed attributes will be identified.

Figure 20A:
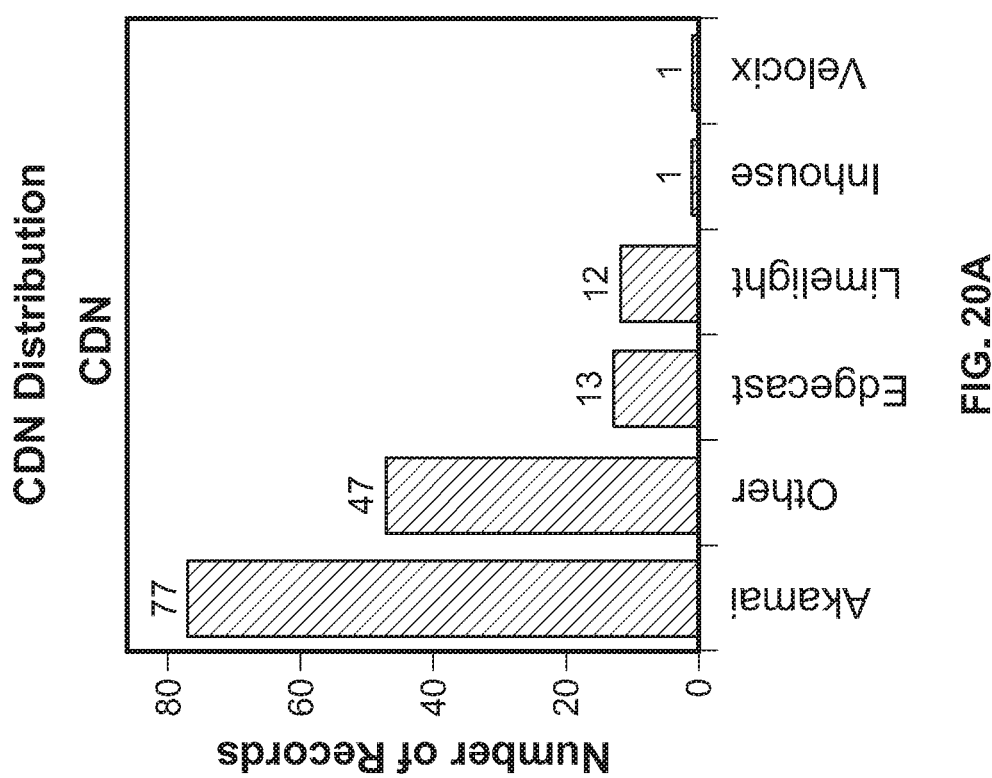
FIG. 20A illustrates an example embodiment of an interface for CDN fault isolation.

FIG. 20A illustrates an example embodiment of an interface for CDN fault isolation. In this example, distribution of CDN among records is shown. For example, the analysis has found 77 incidents of Akamai correlation.

FIG. 20B illustrates an example embodiment of an interface for CDN fault isolation. In the example, shown, the analysis indicates issues with Akamai, Limelight, and EdgeCast CDNs. In this example, session failures are determined based on buffering ratio exceeding a threshold. For each combination of fixed attributes (geolocation, time, publisher, device type) in obtained records/session experience data, aggregate metrics are determined by CDN. Aggregate session failures by CDN are shown for different combinations of fixed attributes.

As one example, for the sessions that have the fixed attributes of geolocation California, time=10/27/15 1:00, Publisher=A, and device type=flash, there are three CDN: Akamai, Amazon, and Level3. For each of the three CDNs found in the sessions with those fixed attributes, the number of IP addresses associated with the CDN and their average rebuffering ratios are determined. For example, there are 16 IP addresses that obtained content. The average buffering ratio for the sessions played by those 16 IP addresses was 9.97, which exceeds a buffering ratio failure threshold. Thus, a fault has been isolated to the CDN. Thus, in this example, a fault has been isolated to a CDN that is outside of an ISP's network.

Example Use Case 4

Figure 21:
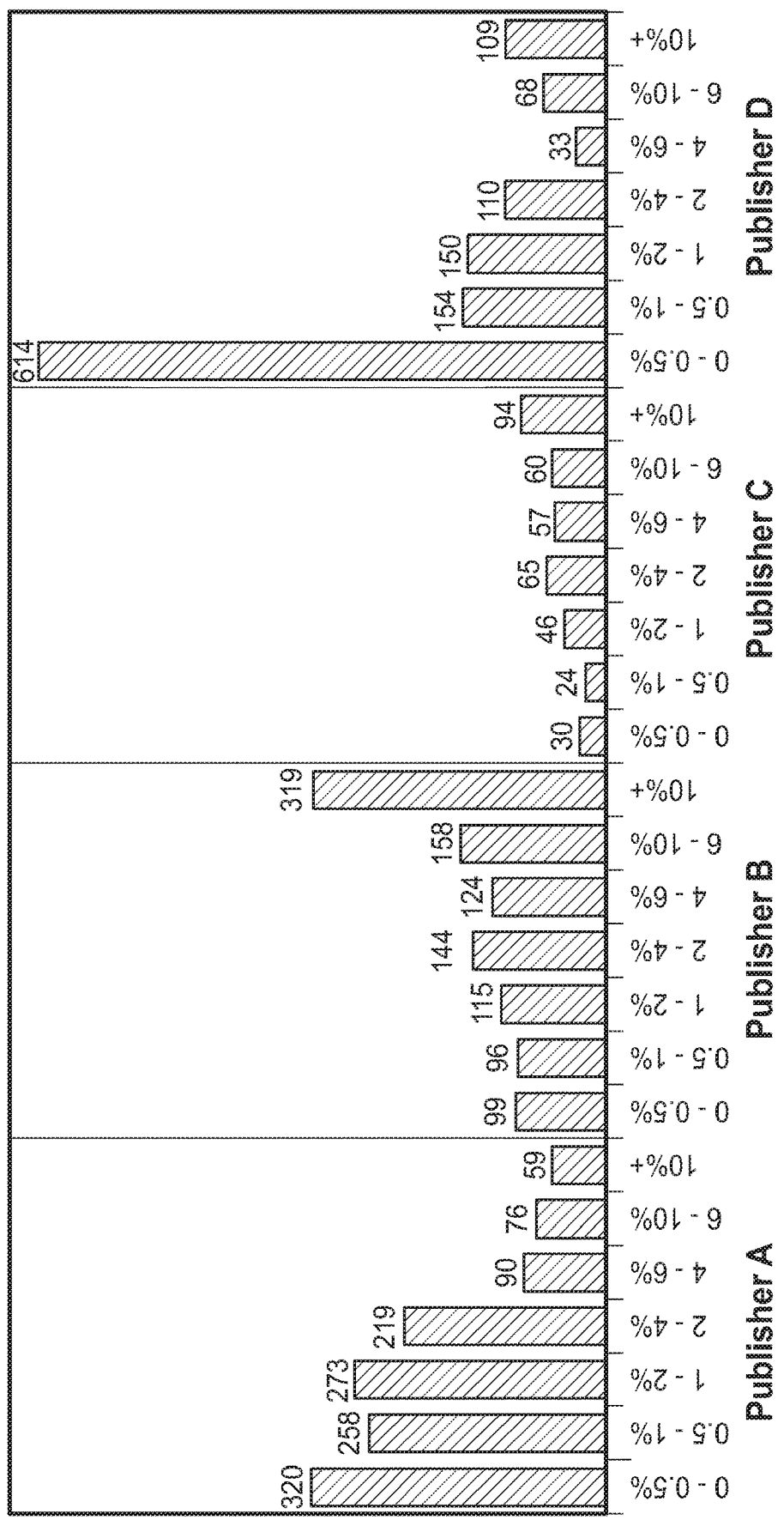
FIG. 21 illustrates an example embodiment of an interface for viewing publisher fault isolation.

FIG. 21 illustrates an example embodiment of an interface for viewing publisher fault isolation. In some embodiments, the fault isolation shown in this example is performed by fault isolation engine 318 of platform 302. In some embodiments, the interface of FIG. 21 is provided by output engine 322. In the example shown, distributions of end user experience quality (as measured by buffering ratio) for four different publishers are shown. In this example, Publisher A has a good distribution. Service groups are primarily mapped to higher quality buckets. In this example, Publisher B has a poor distribution of quality. Most service groups are mapped to poor quality buckets.

Example Use Case 5

Figure 22:
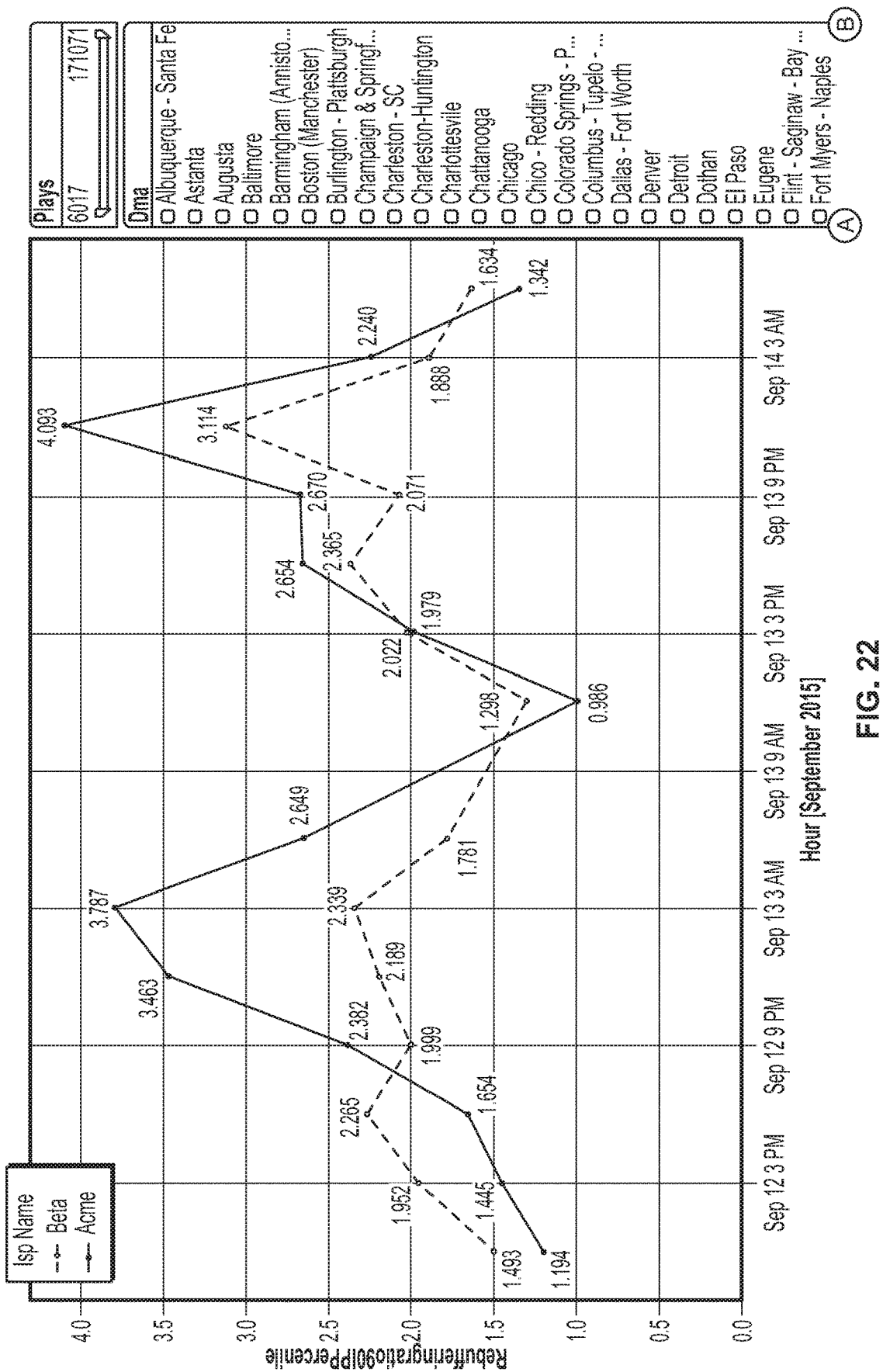
FIG. 22 illustrates an example embodiment of an interface for viewing competitive performance.

FIG. 22 illustrates an example embodiment of an interface for viewing competitive performance. In some embodiments, the interface of FIG. 22 is provided by output engine 320. In the example shown, the performance of ACME service provider in Houston degrades at prime viewing time. However, the same pattern of performance degradation is not visible, or is not as pronounced for BETA service provider in that same area.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a set of mappings of device identifiers to nodes in a network topology associated with a network service provider;
receive, from a plurality of client devices, end user experience data, wherein the end user experience data is associated with device identifiers of the client devices;
based at least in part on the device identifiers of the client devices, associate at least some of the end user experience data with at least some of the nodes in the network topology associated with the network service provider;
based at least in part on the association of the at least some of the end user experience data with the at least some of the nodes in the network topology associated with the network service provider, isolate a node in the network topology as a source of a fault; and
provide output based at least in part on the isolating of the node as the source of the fault; and
a memory coupled to the processor and configured to provide the processor with instructions.

2. The system recited in claim 1 wherein isolating the node in the network topology as the source of the fault further comprises using at least a portion of the end user experience data to determine that streaming sessions associated with at least some of the device identifiers of the client devices failed according to a quality of experience (QoE) metric.

3. The system recited in claim 2 wherein the processor is configured to determine that a streaming session failed according to at least one of video start failure, rebuffering, bitrate, and startup time.

4. The system recited in claim 2 wherein, based at least in part on the set of mappings of device identifiers to nodes in the network topology associated with the network service provider, the processor is further configured to identify, for a device identifier in the at least some device identifiers, one or more nodes in the network topology associated with the network service provider that are on a path through which content was distributed to a device associated with the device identifier.

5. The system recited in claim 4 wherein the processor is further configured to determine, for an identified node on the path, that the node in the network topology associated with the network service provider is problematic, and wherein the node determined to be problematic is isolated as the source of the fault.

6. The system recited in claim 5 wherein the processor is configured to determine that the node in the network topology associated with the network service provider is problematic at least in part by:
determining a number of session failures observed under the node; and
determining that a probability of the observed number of session failures exceeds a threshold.

7. The system recited in claim 5 wherein the processor is further configured to evaluate a set of factors external to the network topology associated with the network service provider.

8. The system recited in claim 7 wherein the set of factors external to the network topology associated with the network service provider comprises one or more of content delivery network, device type, and publisher.

9. The system recited in claim 5 wherein the processor is further configured to obtain performance information associated with the node isolated as the source of the fault.

10. The system recited in claim 9 wherein, based at least in part on the obtained performance information, the processor is further configured to determine a performance threshold for the node isolated as the source of the fault.

11. A method, comprising:
receiving a set of mappings of device identifiers to nodes in a network topology associated with a network service provider;
receiving, from a plurality of client devices, end user experience data, wherein the end user experience data is associated with device identifiers of the client devices;
based at least in part on the device identifiers of the client devices, associating at least some of the end user experience data with at least some of the nodes in the network topology associated with the network service provider;
based at least in part on the association of the at least some of the end user experience data with the at least some of the nodes in the network topology associated with the network service provider, isolating a node in the network topology as a source of a fault; and
providing output based at least in part on the isolating of the node as the source of the fault.

12. The method of claim 11 wherein isolating the node in the network topology as the source of the fault further comprises using at least a portion of the end user experience data to determine that streaming sessions associated with at least some of the device identifiers of the client devices failed according to a quality of experience (QoE) metric.

13. The method of claim 12 wherein it is determined that a streaming session failed according to at least one of video start failure, rebuffering, bitrate, and startup time.

14. The method of claim 12 wherein, based at least in part on the set of mappings of device identifiers to nodes in the network topology associated with the network service provider, further comprising identifying, for a device identifier in the at least some device identifiers, one or more nodes in the network topology associated with the network service provider that are on a path through which content was distributed to a device associated with the device identifier.

15. The method of claim 14 further comprising determining, for an identified node on the path, that the node in the network topology associated with the network service provider is problematic, and wherein the node determined to be problematic is isolated as the source of the fault.

16. The method of claim 15 where it is determined that the node in the network topology associated with the network service provider is problematic at least in part by:
determining a number of session failures observed under the node; and
determining that a probability of the observed number of session failures exceeds a threshold.

17. The method of claim 15 further comprising evaluating a set of factors external to the network topology associated with the network service provider.

18. The method of claim 17 wherein the set of factors external to the network topology associated with the network service provider comprises one or more of content delivery network, device type, and publisher.

19. The method of claim 15 further comprising obtaining performance information associated with the node isolated as the source of the fault.

20. The method of claim 19 further comprising, based at least in part on the obtained performance information, determining a performance threshold for the node isolated as the source of the fault.

21. A computer program product embodied in a non-transitory computer readable storage medium and comprising computer instructions for:
receiving a set of mappings of device identifiers to nodes in a network topology associated with a network service provider;
receiving, from a plurality of client devices, end user experience data, wherein the end user experience data is associated with device identifiers of the client devices;
based at least in part on the device identifiers of the client devices, associating at least some of the end user experience data with at least some of the nodes in the network topology associated with the network service provider;

based at least in part on the association of the at least some of the end user experience data with the at least some of the nodes in the network topology associated with the network service provider, isolating a node in the network topology as a source of a fault; and providing output based at least in part on the isolating of the node as the source of the fault.

* * * * *